US011247658B2

(12) United States Patent
Kumazaki et al.

(10) Patent No.: US 11,247,658 B2
(45) Date of Patent: Feb. 15, 2022

(54) VEHICLE CONTROL APPARATUS

(71) Applicants: TOYOTA JIDOSHA KABUSHIKI KAISHA, Toyota (JP); Aisin AW Co., Ltd., Anjo (JP)

(72) Inventors: Kenta Kumazaki, Anjo (JP); Tooru Matsubara, Toyota (JP); Daisuke Suyama, Anjo (JP); Mitsuru Maeda, Anjo (JP); Tomoyasu Kimura, Anjoi (JP)

(73) Assignees: TOYOTA JIDOSHA KABUSHIKI KAISHA, Toyota (JP); Aisin AW CO., Ltd., Anjo (JP)

(*) Notice: Subject to any disclaimer, the term of this patent is extended or adjusted under 35 U.S.C. 154(b) by 230 days.

(21) Appl. No.: 16/719,873

(22) Filed: Dec. 18, 2019

(65) Prior Publication Data

US 2020/0198616 A1    Jun. 25, 2020

(30) Foreign Application Priority Data

Dec. 20, 2018  (JP) ............................. JP2018-238927

(51) Int. Cl.
*B60W 20/00*        (2016.01)
*B60W 10/10*        (2012.01)
(Continued)

(52) U.S. Cl.
CPC .............. *B60W 20/00* (2013.01); *B60K 6/24* (2013.01); *B60K 6/36* (2013.01); *B60K 6/365* (2013.01); *B60K 6/383* (2013.01); *B60K 6/387* (2013.01); *B60K 6/445* (2013.01); *B60K 6/543* (2013.01); *B60K 6/547* (2013.01); *B60W 10/02* (2013.01);
(Continued)

(58) Field of Classification Search
None
See application file for complete search history.

(56) References Cited

U.S. PATENT DOCUMENTS

2003/0203790 A1* 10/2003 Matsubara ............ B60W 30/18
                                                           477/107
2005/0266957 A1* 12/2005 Kamijo ................. B60W 10/06
                                                           477/3

(Continued)

FOREIGN PATENT DOCUMENTS

JP         2014223888 A    12/2014

*Primary Examiner* — Colby M Hansen
(74) *Attorney, Agent, or Firm* — Hunton Andrews Kurth LLP

(57) ABSTRACT

A control apparatus for a vehicle provided, with a step-variable transmission, includes: a feedback control portion; an input torque resetting control portion; a target input torque setting portion operated upon an increase of the accelerator pedal operation amount in the process of the shift-down action in a power-off state of the vehicle, to restrict an amount of increase of the input torque target value with respect to an amount of increase of an operator-required input torque value, so as to keep the target value not larger than an upper limit value until termination of the input torque resetting control; and an actual input torque increasing portion operated upon the increase of the accelerator pedal operation amount prior to initiation of the inertia phase, to implement an input torque increasing control to control the input torque so as to be larger than the target value, prior to the inertia phase initiation.

7 Claims, 7 Drawing Sheets

(51) Int. Cl.
   *B60W 30/19*   (2012.01)
   *F16D 25/00*   (2006.01)
   *F16D 48/06*   (2006.01)
   *B60K 6/24*    (2007.10)
   *B60K 6/26*    (2007.10)
   *B60K 6/36*    (2007.10)
   *B60K 6/543*   (2007.10)
   *B60K 6/387*   (2007.10)
   *B60W 10/02*   (2006.01)
   *B60K 6/383*   (2007.10)
   *B60K 6/445*   (2007.10)
   *B60K 6/547*   (2007.10)
   *B60K 6/365*   (2007.10)

(52) U.S. Cl.
   CPC ............ B60W 10/10 (2013.01); B60W 30/19 (2013.01); F16D 48/06 (2013.01); *B60K 6/26* (2013.01); *B60W 2510/0291* (2013.01); *B60W 2540/10* (2013.01); *B60W 2710/027* (2013.01); *B60W 2710/105* (2013.01); *B60Y 2200/92* (2013.01); *F16D 25/00* (2013.01); *F16D 2500/10412* (2013.01); *F16D 2500/30421* (2013.01); *F16D 2500/30806* (2013.01); *F16D 2500/30808* (2013.01); *F16D 2500/3144* (2013.01)

(56) References Cited

U.S. PATENT DOCUMENTS

| | | | |
|---|---|---|---|
| 2006/0017414 A1* | 1/2006 | Joe | B60W 10/08 318/432 |
| 2008/0119319 A1* | 5/2008 | Kaya | B60K 6/445 477/3 |
| 2008/0153665 A1* | 6/2008 | Uchiyama | F16H 61/66259 477/49 |
| 2009/0152029 A1* | 6/2009 | Matsubara | B60W 30/192 180/65.265 |
| 2012/0065856 A1* | 3/2012 | Hansen | B60W 20/00 701/67 |
| 2014/0343775 A1 | 11/2014 | Yamamoto et al. | |
| 2016/0068155 A1* | 3/2016 | Hashimoto | B60W 10/02 701/22 |

* cited by examiner

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

| OVERALL SPEED POSITION | 1 | 2 | 3 | 4 | 5 | 6 | 7 | 8 | 9 | 10 |
|---|---|---|---|---|---|---|---|---|---|---|
| AT GEAR POSITION | 1 | 1 | 1 | 2 | 2 | 2 | 3 | 3 | 3 | 4 |

VEHICLE CONTROL APPARATUS

This application claims priority from Japanese Patent Application No. 2018-238927 filed on Dec. 20, 2018, the disclosure of which is incorporated herein by reference in its entirety.

FIELD OF THE INVENTION

The present invention relates to a control apparatus for a vehicle provided with a drive power source, drive wheels, and a step-variable transmission which constitutes a part of a power transmitting path between the drive power source and the drive wheels.

BACKGROUND OF THE INVENTION

There is well known a control apparatus for a vehicle provided with an engine, drive wheels, and a step-variable transmission which constitutes a part of a power transmitting path between the engine and the drive wheels and which has a plurality of coupling devices which are selectively engaged to establish a selected one of a plurality of gear or speed positions. For example, JP2014-223888A discloses a control apparatus for controlling a hybrid vehicle. The control apparatus disclosed in the above-identified publication is configured to control an input torque of the step-variable transmission, by implementing a feedback compensation control of a target value of the input torque according to an amount of operation of an accelerator pedal by an operator of the hybrid vehicle, such that a rate of change of a rotating speed of an input rotary member of the step-variable transmission, which rate represents a rotating state of the input rotary member in the process of a shifting action of the step-variable transmission, coincides with a target value.

SUMMARY OF THE INVENTION

Where the input torque of the step-variable transmission is feedback-controlled in the process of its shifting action as disclosed in the publication JP2014-223888A, there is a possibility that the input torque of the step-variable transmission deviates from the target value when the rotating speed of the input rotary member has become equal to a post-shifting synchronization value. In this event, a torque resetting control is implemented to reset the input torque of the step-variable transmission to the target value, after the rotating speed of the input rotary member has become equal to the post-shifting synchronization value. By the way, when the target value of the input torque of the step-variable transmission is increased due to a requirement of the vehicle operator to accelerate the vehicle with an increase of the operation amount of the accelerator pedal or an operation of the accelerator pedal again in the process of a power-off shift-down action of the step-variable transmission in a non-operated state of the accelerator pedal, there is a risk of generation of a so-called "backlash-elimination shock" due to elimination of a backlash in the power transmitting path of the step-variable transmission in the process of its shift-down action. To avoid this risk, it is considered effective to restrict an amount of increase of the target value of the input torque of the step-variable transmission with respect to an increase of a required value of the input torque represented by the operation amount of the accelerator pedal, so that the target value of the input torque is limited to or below a predetermined value until the torque resetting control is terminated. However, the restriction of the amount of increase of the target value of the input torque results in delaying a moment of initiation of an inertia phase of the shift-down action as compared with the moment in the absence of the restriction, in the event of the operator's requirement for acceleration of the vehicle prior to the initiation of the inertia phase. This delay of initiation of the inertia phase leads to deterioration of a control response to the operator's vehicle acceleration requirement.

The present invention was made in view of the background art described above. It is therefore an object of the present invention to provide a control apparatus for a vehicle provided with a step-variable transmission, which control apparatus permits an improvement of the control response to the operator's vehicle acceleration requirement upon an increase of the operation amount of the accelerator pedal in the process of the power-off shift-down action of the step-variable transmission, while reducing the risk of generation of the "backlash-elimination shock".

The object indicated above is achieved according to the following modes of the present invention:

According to a first mode of the invention, there is provided a control apparatus for a vehicle provided with a drive power source, drive wheels, and a step-variable transmission which constitutes a part of a power transmitting path between the drive power source and the drive wheels and which has a plurality of coupling devices which are selectively engaged to establish a selected, one of a plurality of gear positions, the control apparatus comprising: a feedback control portion configured to implement a feedback control of an input torque of the step-variable transmission during an inertia phase of a shift-down action of the step-variable transmission, by feedback compensation of a target value of the input torque according to an operation amount of an accelerator pedal by an operator of the vehicle, such that a value representative of a state of rotation of an input rotary member of the step-variable transmission coincides with a target value at which a rotating speed of the input rotary member changes toward a post-shifting synchronization value to be established after completion of the shift-down action; a state determining portion configured to determine whether the rotating speed of the input rotary member is equal to the post-shifting synchronization value; an input torque resetting control portion configured to implement an input torque resetting control to change the input torque of the step-variable transmission toward the target value, when the state determining portion determines that the rotating speed of the input rotary member is equal to the post-shifting synchronization value; a target input torque setting portion configured to be operated when the operation amount of the accelerator pedal is increased in the process of the shift-down action implemented in a power-off state of the vehicle, the target input torque setting portion restricting an amount of increase of the target value of the input torque with respect to an amount of increase of an operator-required input torque value represented by the operation amount of the accelerator pedal, so as to keep the target value of the input torque not larger than a predetermined upper limit value until the input torque resetting control is terminated; and an actual input torque increasing portion configured to be operated when the operation amount of the accelerator pedal is increased prior to a moment of initiation of the inertia phase of the shift-down action in the power-off state, the actual input torque increasing portion implementing an input torque increasing control to control the input torque of the step-variable transmission so as to be larger than the target value, prior to the moment of initiation of the inertia phase of the shift-down action.

According to a second mode of the invention, the control apparatus according to the first mode of the invention further comprises a shifting control portion configured to be operated when the input torque increasing control is implemented by the actual input torque increasing portion, the shifting control Portion controlling a torque capacity of a releasing-side coupling device of the plurality of coupling devices which is to be brought into a released state to implement the shift-down action, and a torque capacity of an engaging-side coupling device of the coupling devices which is to be brought into an engaged state to implement the shift-down action, the shifting control portion reducing the torque capacity of the releasing-side coupling device at an earlier point of time than when the shifting control portion increases the torque capacity of the engaging-side coupling device.

According to a third node of the invention, the control apparatus according to the first or second mode of the invention is configured such that the target input torque setting portion gradually changes the target value of the input torque toward the operator-required input torque value after termination of the input torque resetting control implemented by the input torque resetting control portion.

According to a fourth mode of the invention, the control apparatus according to any one of the first through third modes of the invention further comprises an actual input torque reducing portion configured to reduce the input torque of the step-variable transmission with a change of the rotating speed of the input rotary member of the step-variable transmission toward the post-shifting synchronization value, while the input torque during the inertia phase of the shift-down action is larger than the target value.

According to a fifth mode of the invention, the control apparatus according to any one of the first through fourth modes of the invention is configured such that the actual input torque increasing portion implements the input torque increasing control when the operation amount of the accelerator pedal is increased by an amount not smaller than a predetermined value.

According to a sixth mode of the invention, the control apparatus according to any one of the first through fifth modes of the invention is configured such that the plurality of coupling devices are hydraulically operated frictional coupling devices, and such that the actual input torque increasing portion implements the input torque increasing control when a temperature of a working fluid used to operate the hydraulically operated frictional coupling devices is not lower than a predetermined value.

According to a seventh mode of the invention, the control apparatus according to any one of the first through sixth modes of the invention is configured to control the vehicle which is a hybrid vehicle provided with: an engine functioning as the drive power source; an electrically controlled transmission mechanism having a differential mechanism to which the engine is operatively connected in a power transmittable manner and a first motor/generator to which the differential mechanism is operatively connected in a power transmittable manner such that a differential state of the differential mechanism is controlled by controlling an operating state of the first motor/generator; and a second motor/generator operatively connected to an output rotary member of the electrically controlled transmission mechanism in a power transmittable manner and also functioning as the drive power source, in this seventh mode of the invention, the step-variable transmission is a mechanically operated transmission mechanism constituting a part of a power transmitting path between the output rotary member of the electrically controlled transmission mechanism and the drive wheels, and the feedback control portion is configured to feedback-control an output torque of the first motor/generator and an output torque of the second motor/generator during the inertia phase of a shifting action of the mechanically operated transmission mechanism, on the basis of an output torque of the engine and a torque transmitted through the mechanically operated transmission mechanism, such that a value representative of a state of rotation of an input rotary member of the mechanically operated transmission mechanism and a value representative of a state of operation of the engine coincide with respective target values. Further, the input torque resetting control portion is configured to implement the input torque resetting control when the rotating speed of the input rotary member of the mechanically operated transmission mechanism has become equal to the post-shifting synchronization value.

As described above, the control apparatus according to the first mode of the invention is configured such that when the operation amount of the accelerator pedal is increased in the process of the shift-down action implemented in the power-off state of the vehicle, the amount of increase of the target value of the input torque is restricted with respect to the amount of increase of the operator-required input torque value represented by the operation amount of the accelerator pedal, so as to keep the target value of the input torque not larger than the predetermined upper limit value until the input torque resetting control is terminated, so that the previously described risk of backlash-elimination shock of the step-variable transmission upon completion of the shift-down action can be reduced. Further, upon an increase of the operation amount of the accelerator pedal prior to a moment of initiation of the inertia phase of the shift-down action in the power-off state, the input torque increasing control is implemented to control the input torque of the step-variable transmission so as to be larger than the target value, prior to the moment of initiation of the inertia phase of the shift-down action. Accordingly, the present control apparatus permits early initiation of the inertia phase of the shift-down action even where the target value of the input torque of the step-variable transmission is limited to or below the predetermined upper limit value. Thus, the present control apparatus permits an improvement of a control response to an operator's requirement for acceleration of the vehicle upon an increase of the operation amount of the accelerator pedal in the process of the power-off shift-down action of the step-variable transmission, while reducing the risk of generation of the backlash-elimination shock.

The control apparatus according to the second mode of the invention is configured such that when the input torque increasing control is implemented by the actual input torque increasing portion, the torque capacity of the releasing-side coupling device is reduced at the earlier point of time than when the torque capacity of the engaging-side coupling device is increased, so that the input torque of the step-variable transmission is increased while the transmission torque of the step-variable transmission is relatively small or zero. Accordingly, the risk of generation of the backlash-elimination shock of the step-variable transmission can be reduced, even when the vehicle is switched from its non-driven state to its driven state in the process of the input torque increasing control.

The control apparatus according to the third mode of the invention is configured such that the target value of the input torque is gradually changed toward the operator-required input torque value after termination of the input torque resetting control, so that the operator's requirement for acceleration of the vehicle can be met while at the same time the risk of generation of the backlash-elimination shock can be reduced.

The control apparatus according to the fourth mode of the invention is configured such that the input torque of the step-variable transmission is reduced with the change of the rotating speed of the input rotary member of the step-variable transmission toward the post-shifting synchronization value, while the input torque during the inertia phase of the shift-down action is larger than the target value, so that the risk of generation of the backlash-elimination shock of the step-variable transmission upon completion of the shift-down action can be further reduced.

The control apparatus according to the fifth mode of the invention is configured such that the input torque increasing control is implemented by the actual input torque increasing portion when the operation amount of the accelerator pedal is increased by the amount not smaller than the predetermined value, so that it is possible to adequately improve the control response to the operator's requirement for acceleration of the vehicle, while reducing the risk of generation of the backlash-elimination shock, where the operator has a comparatively high degree of requirement for the vehicle acceleration. Where the operator has a comparatively low degree of requirement for the vehicle acceleration, the risk of generation of the backlash-elimination shock can be further reduced.

The control apparatus according to the sixth mode of the invention is configured such that the actual input torque increasing portion implements the input torque increasing control when the temperature of the working fluid used to operate the hydraulically operated frictional coupling devices is not lower than the predetermined value. Namely, the input torque increasing control is not implemented at the relatively low temperature of the working fluid at which a hydraulic control response of the coupling devices is low. Accordingly, it is possible to reduce deterioration of controllability of the shift-down action of the step-variable transmission due to a loss of balance between the engaging torques of the relevant two frictional coupling devices controlled to implement the shift-down action and the input torque to the step-variable transmission.

The control apparatus according to the seventh mode of the invention is configured to control the hybrid vehicle provided with the electrically controlled transmission mechanism and the mechanically operated transmission mechanism which are disposed in series with each other. The present control apparatus permits an improvement of the control response to the operator's vehicle acceleration requirement, while reducing the risk of generation of the backlash-elimination shock, upon an increase of the accelerator pedal operation amount in the process of the power-off shift-down action of the mechanically operated transmission mechanism.

DETAILED DESCRIPTION OF PREFERRED EMBODIMENT

In the present specification, it will be understood that a state of rotation of each of rotary members is represented by a rotating speed N of the rotary member or a rate of change $dN/dt$ of the rotating speed N, for instance. Examples of the rotary members include: an engine; a first motor/generator; a second motor/generator; each rotary element of a differential mechanism; an output rotary member of an electrically controlled transmission mechanism; and an input rotary member of a step-variable transmission, which have been referred to above with respect to the seventh mode of the invention. The rotating speed N of the rotary member corresponds to an angular velocity of the rotary member. The rate of change $dN/dt$ of the rotating speed N is a rate of change of the rotating speed N per unit time, namely a time derivative of the rotating speed N, and an angular acceleration value of the rotary member. In a mathematical equation (1) given below, the rate of change $dN/dt$ is represented by N with a dot (•) placed thereon.

It will also be understood that a speed ratio of each of the above-described step-variable transmission, and a transmission device consisting of the electrically controlled transmission mechanism and the mechanically operated step-variable transmission mechanism which are disposed in series with each other is a ratio of a rotating speed of an input rotary member of the transmission or transmission device to a rotating speed of an output rotary member of the transmission or transmission device. A gear position or speed position of the transmission or transmission device which has a relatively low speed ratio is established or used for driving the vehicle at a relatively high running speed. On the other hand, a gear position or speed position of the transmission or transmission device which has a relatively high speed ratio is established or used for driving the vehicle at a relatively low running speed. For example, the gear position having the highest speed ratio is the lowest-speed gear position.

One preferred embodiment of this invention will be described in detail, by reference to the drawings.

Figure 1:
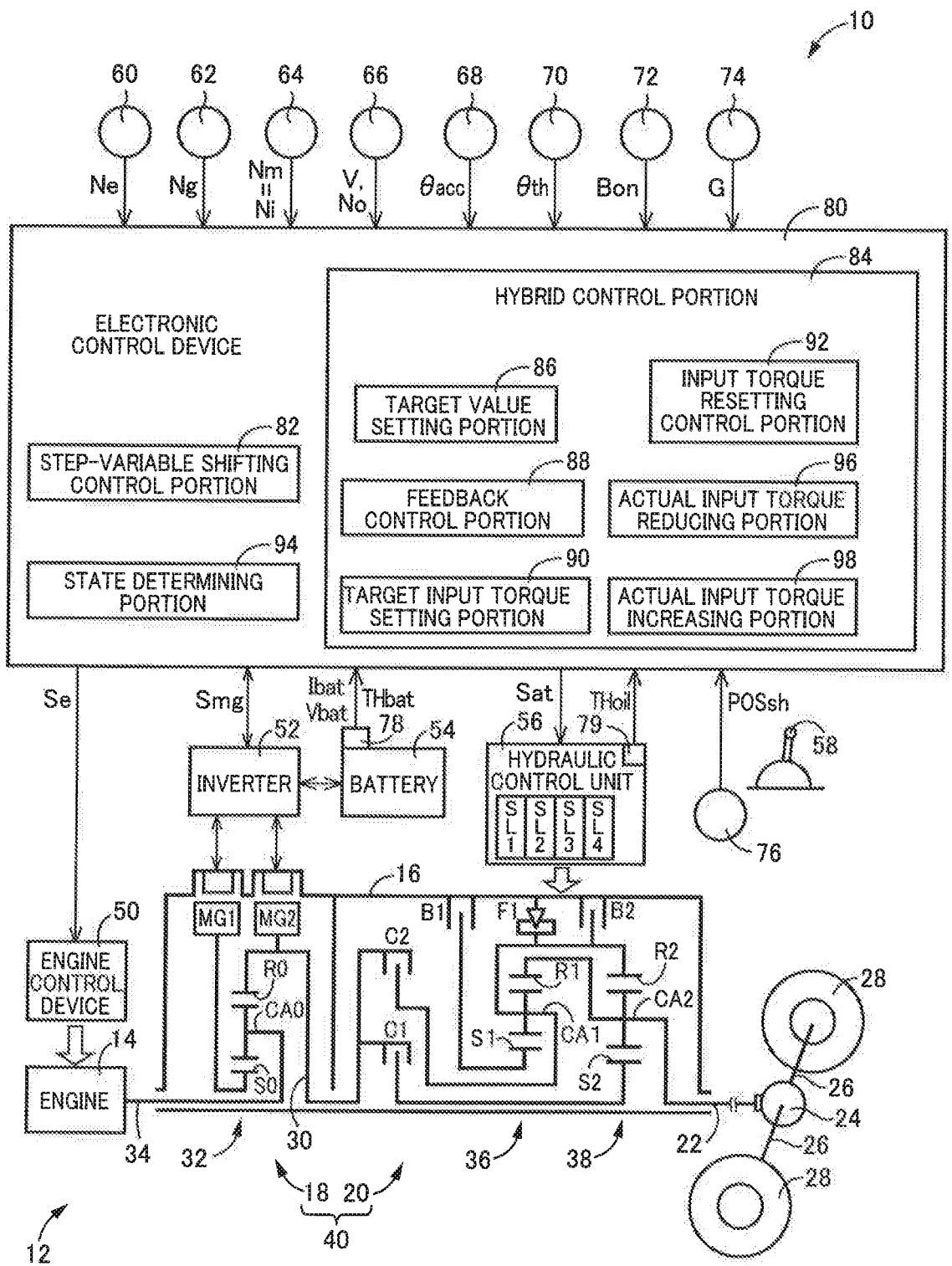
FIG. 1 is a schematic view showing an arrangement of a drive system of a vehicle to be controlled by a control apparatus according to one embodiment of the present invention, and major control functions and control portions of the control apparatus.

Reference is first made to FIG. 1, which is the schematic view showing an arrangement of a drive system 12 of a vehicle 10 to be controlled by a control apparatus according to the present invention, and major control functions and control portions of the control apparatus. As shown in FIG. 1, the vehicular drive system 12 is provided with an engine 14 functioning as a vehicle drive power source, an electrically controlled continuously-variable transmission portion 18, and a mechanically operated step-variable transmission portion 20. The continuously-variable transmission portion 18 and the step-variable transmission portion 20 are disposed in series with each other within a stationary member in the form of a transmission casing 16 fixed to a body of the vehicle 10 such that the transmission portions 18 and 20 are disposed coaxially with each other on a common axis. The electrically controlled continuously-variable transmission portion 18 is connected directly, or indirectly through a damper (not shown), to the engine 14, while the mechanically operated step-variable transmission portion 20 is connected to an output rotary member of the electrically controlled continuously-variable transmission portion 18. The vehicular drive system 12 is further provided with a differential gear mechanism 24 connected to an output rotary member in the form of an output shaft 22 of the mechanically operated step-variable transmission portion 20, and a pair of axles 26 connected to the differential gear mechanism 24. In the vehicular drive system 12, a drive force generated by the engine 14 and a second motor/generator MG2 (described below) is transmitted to the mechanically operated step-variable transmission portion 20, and is transmitted from the mechanically operated step-variable transmission portion 20 to left and right drive wheels 28 of the vehicle 10 through the differential gear mechanism 24 and other devices. The vehicular drive system 12 is suitably used in the vehicle 10 of an FR type (front-engine rear-drive type) in which the axis of the engine 14 is parallel to the longitudinal direction of the vehicle 10. It is noted that the transmission casing 16 will be hereinafter referred to simply as "casing 16", while the electrically controlled continuously-variable transmission portion 18 and the mechanically operated step-variable transmission portion 20 are hereinafter referred to respectively as the continuously-variable transmission portion 18 and the step-variable transmission portion 20. It is also noted that the drive force is considered equivalent to a torque or power, unless otherwise specifically distinguished from each other. It is further noted that the continuously-variable and step-variable transmission portions 18 and 20 are constructed substantially symmetrically with each other about the above-indicated common axis, and that FIG. 1 does not show the lower halves of the transmission portions 18 and 20. A crankshaft of the engine 14 and a connecting shaft 34 described below are coaxial with the above-indicated common axis.

The engine 14 is the drive power source to drive the vehicle 10, which is a known internal combustion engine such as a gasoline engine or a diesel engine. In the present embodiment, the engine 14 is a gasoline engine using a gasoline as the fuel. An engine torque Te which is an output torque of this engine 14 is controlled by an engine control device 50 which is controlled by an electronic control device 80 described below. The engine control device 50 includes an electronic throttle valve, a fuel injecting device and an igniting device, which are provided on the vehicle 10. In the present embodiment, the engine 14 is connected to the continuously-variable transmission portion 18, without a fluid-operated type power transmitting device such as a torque converter or a fluid coupling being disposed between the engine 14 and the continuously-variable transmission portion 18.

The continuously-variable transmission portion 18 is provided with: a first motor/generator MG1; a power distributing mechanism in the form of a differential mechanism 32 configured to mechanically distribute the drive force of the engine 14 to the first motor/generator MG1, and to an intermediate power transmitting member 30 which is the output rotary member of the continuously-variable transmission portion 18. The second motor/generator MG2 is operatively connected to the intermediate power transmitting member 30 in a power transmittable manner. The continuously-variable transmission portion 18 is an electrically controlled continuously-variable transmission wherein a differential state of the differential mechanism 32 is controllable by controlling an operating state (torque, etc.) of the first motor/generator MG1. The first motor/generator MG1 functions as a differential motor/generator which permits controlling of an engine speed Ne, namely, an operating speed of the engine 14. On the other hand, the second motor/generator MG2 is a motor/generator which functions as the vehicle drive power source, namely, a vehicle driving electric motor. The vehicle 10 is a hybrid vehicle provided with the vehicle drive power source in the form of the engine 14 and the second motor/generator MG2. The operating state of the first motor/generator MG1 is controlled in a predetermined manner.

Each of the first motor/generator MG1 and the second motor/generator MG2 is an electrically operated rotary device having a function of an electric motor and a function of an electric generator. The first motor/generator MG1 and the second motor/generator MG2 are connected to an electric power storage device in the form of a battery 54 through an inverter 52. The inverter 52 and the battery 54 are provided on the vehicle 10, and the inverter 52 is controlled by the above-indicated electronic control device 80, to control an output torque of the first motor/generator MG1, namely, an MG1 torque Tg, and an output torque of the second motor/generator MG2, namely, an MG2 torque Tm. Positive values of the MG1 torque Tg and MG2 torque Tm acting to accelerate the vehicle 10 are vehicle driving torques, while negative values of the MG1 torque Tg and MG2 torque Tm acting to decelerate the vehicle 10 are regenerative torques. The battery 54 is the electric power storage device to and from which an electric power is supplied from and to the first motor/generator MG1 and the second motor/generator MG2.

The differential mechanism 32 is a planetary gear set of a single-pinion type having a sun gear S0, a carrier CA0 and a ring gear R0. The carrier CA0 is operatively connected to the engine 14 through the connecting shaft 34 in a power transmittable manner, and the sun gear S0 is operatively connected to the first motor/generator MG1 in a power transmittable manner, while the ring gear R0 is operatively connected to the second motor/generator MG2 in a power transmittable manner. In the differential mechanism 32, the carrier CA0 functions as an input rotary element, and the sun gear S0 functions as a reaction rotary element, while the ring gear R0 functions an output rotary element.

The step-variable transmission portion 20 is a mechanically operated transmission mechanism functioning as a step-variable transmission constituting a part of a power transmitting path between the intermediate power transmitting member 30 and the drive wheels 28, namely, a mechanically operated transmission mechanism constituting a part of a power transmitting path between the continuously-variable transmission portion 18 and the drive wheels 28. The intermediate power transmitting member 30 also functions as an input rotary member of the step-variable transmission portion 20. The intermediate power transmitting member 30 is connected to the second motor/generator MG2 such that the intermediate power transmitting member 30 and a rotor of the second motor/generator MG2 are rotated as a unit. Further, the engine 14 is connected to an input rotary member of the continuously-variable transmission portion 18. Accordingly, the step-variable transmission portion 20 is a transmission constituting a part of a power transmitting path between the drive power source in the form of the second motor/generator MG2 and the engine 14, and the drive wheels 28. The intermediate power transmitting member 30 is a power transmitting member for transmitting the drive force of the drive power source to the drive wheels 28. The step-variable transmission portion 20 is a known automatic transmission of a planetary gear type which is provided with a plurality of planetary gear sets in the form of a first planetary gear set 36 and a second planetary gear set 38, and a plurality of coupling devices in the form of a clutch C1, a clutch C2, a brake B1 and a brake B2 as well as a one-way clutch F1. The clutches C1 and C2 and the brakes B1 and B2 will be hereinafter simply referred to as "coupling devices CB" unless otherwise specified.

Each of the coupling devices CB is a hydraulically operated frictional coupling device in the form of a multiple-disc type or a single-disc type clutch or brake, or a band brake, which is operated by a hydraulic actuator. The coupling devices CB are selectively placed in their engaged or released states with their torque capacities or engaging torques Tcb being changed according to engaging hydraulic pressures PRcb applied thereto, which are regulated by respective solenoid-operated valves SL1-SL4 incorporated within a hydraulic control unit 56. To permit an input torque Ti of the step-variable transmission portion 20 to be transmitted between the intermediate power transmitting member 30 and the output shaft 22, without slipping actions of the coupling devices CB placed in the engaged states, a sum of the engaging torques Tcb of these coupling devices CB is required to be equal to the input torque Ti, which is a sum of the torques to be transmitted through the respective coupling devices CB. In this respect, it is noted that the maximum torques to be transmitted through the coupling devices CB will not be increased by increasing the engaging torques Tcb after the torques to be transmitted through the coupling devices CB have been increased to the maximum values. Namely, the required engaging torques Tcb are equal to the maximum torques that can be actually transmitted through the coupling devices CB. It is also noted that the coupling devices CB are considered to have no slipping actions where there is not a difference between rotating speeds of two coupling rotary elements of each coupling device CB. The engaging torques Tcb and the engaging hydraulic pressures PRcb are substantially proportional to each other, after the engaging hydraulic pressures PRcb have been raised to fill the hydraulic actuators for the coupling devices CB.

In the step-variable transmission portion 20, selected ones of rotary elements of the first and second planetary gear sets 36 and 38 are connected to each other or to the intermediate power transmitting member 30, casing 16 or output shaft 22, either directly or indirectly through the coupling devices CB or the one-way clutch. The first planetary gear set 36 is provided with the rotary elements in the form of a sun gear S1, a carrier CA1 and a ring gear R1, while the second planetary gear set 38 is provided with the rotary elements in the form of a sun gear S2, a carrier CA2 and a ring gear R2.

The step-variable transmission portion 20 is shifted to a selected one of four gear positions (speed positions) by engaging actions of selected ones of the coupling devices CB. These four gear positions have respective different speed ratios γat (=AT input speed Ni/output speed No). Namely, the step-variable transmission portion 20 is shifted up and down from one gear position to another by placing selected ones of the coupling devices CB in their engaged states. That is, the step-variable transmission portion 20 is a step-variable automatic transmission having a plurality of gear or speed positions. In the present embodiment, the plurality of gear positions established by the step-variable transmission portion 20 will be referred to as "AT gear positions". The AT input speed Ni is a rotating speed of the input rotary member of the step-variable transmission portion 20, that is, an input speed of the step-variable transmission portion 20, which is equal to a rotating speed of the intermediate power transmitting member 30, and to an MG2 speed Nm which is an operating speed of the second motor/generator MG2. The AT input speed Ni is represented by the MG2 speed Nm. On the other hand, the output speed No is a rotating speed of the output shaft 22 of the step-variable transmission portion 20, that is, an output speed of the step-variable transmission portion 20, which is considered to be an output speed of a transmission device 40 which consists of the continuously-variable transmission portion 18 and the step-variable transmission portion 20. In the present embodiment, the transmission device 40 as a whole serves as an automatic transmission constituting the part of the power transmitting path between the engine 14 and the drive wheels 28.

Figures 2, 3:
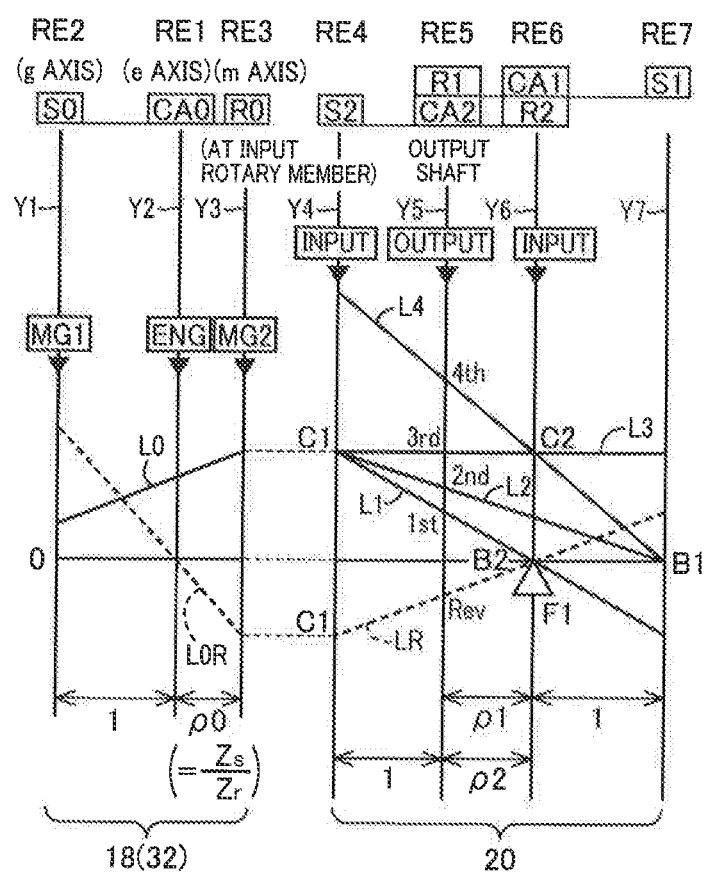
FIG. 2 is a table indicating a relationship between AT gear positions of a mechanically operated step-variable transmission portion shown in FIG. 1 and combinations of coupling devices placed in engaged states to establish the respective AT gear positions.
FIG. 3 is a collinear chart indicating a relationship among rotating speeds of rotary elements of an electrically controlled continuously-variable transmission portion and the mechanically operated step-variable transmission portion.

Reference is now made to FIG. 2, which is the table indicating the relationship between the first through fourth AT gear positions of the step-variable transmission portion 20 and combinations of the coupling devices CB placed in the engaged states to establish the respective AT gear positions. In the table of FIG. 2, the four AT gear positions are respectively represented by "1st", "2nd", "3rd" and "4th". The first speed AT gear position "1st" has a highest speed ratio γat, and the speed ratios γat of the four AT gear positions decrease in the direction from the first speed AT gear position (lowest-speed gear position) "1st" toward the fourth speed AT gear position (highest-speed gear position) "4th". In the table, "O" indicates the engaged states of the coupling devices CB, "Δ" indicates the engaged states of the coupling device B2 during application of an engine brake to the vehicle 10 or during a coasting shift-down action of the step-variable transmission portion 20 during a coasting run of the vehicle 10, while the blank indicates the released state of the coupling devices CB. The one-way clutch F1 indicated above is disposed parallel to the brake B2 which is placed in the engaged state to establish the first speed AT gear position "1st". Accordingly, the first speed AT gear position "1st" is established with the engaging action of the brake B2 or alternatively the engaging action of the one-way clutch F1. Thus, the brake B2 is not required to be placed in the engaged state upon starting or acceleration of the vehicle 10. For instance, the step-variable transmission portion 20 performs the coasting shift-down action during deceleration of the vehicle 10 in the non-operated position of the accelerator pedal its operation amount θacc being zero or substantially zero. It is noted that the step-variable transmission portion 20 is placed in its neutral state when all of the coupling devices CB are placed in their released states. In this neutral state, a drive force cannot be transmitted through the step-variable transmission portion 20. Since the one-way clutch F1 is an automatically engaged and released clutch, the step-variable transmission portion 20 is brought into its neutral state by the engaging actions of all of the coupling devices CB. It is also noted that when a determination that a shift-down action of the step-variable transmission portion 20 should be performed is made, the step-variable transmission portion 20 is required to be shifted down.

The step-variable transmission portion 20 is shifted up or down to establish a newly selected one of the four AT gear positions, according to the operation amount θacc of the accelerator pedal by an operator of the vehicle 10 and the running speed V of the vehicle 10, with a releasing action of one of the coupling devices CB and a concurrent engaging action of another coupling device CB, which concurrent releasing and engaging actions are controlled by the above-indicated electronic control device 80. The above-indicated one coupling device CB (referred to as a "releasing-side coupling device CR") was placed in the engaged state before the step-variable transmission portion 20 is shifted to establish the newly selected AT gear position, while the above-indicated another coupling device CB (referred to as an "engaging-side coupling device CB") was placed in the released state before the step-variable transmission portion 20 is shifted to establish the newly selected AT gear position. Thus, the step-variable transmission portion 20 is shifted up or down from one of the AT gear positions to another by so-called "clutch-to-clutch" shifting operation, namely, concurrent releasing and engaging actions of the releasing-side and engaging-side coupling devices CB. For example, a shift-down action of the step-variable transmission portion 20 from the second speed AT gear position "2nd" to the first speed AT gear position "1st" is implemented by the concurrent releasing and engaging actions of the respective brakes B1 and B2, as is apparent from the table of FIG. 2. In the process of this shift-down action, the transient hydraulic pressure of the brake B1 (releasing-side coupling device CB) to be brought into its released state and the transient hydraulic pressure of the brake B2 (engaging-side coupling device CB) to be brought into its engaged state are suitably regulated. The releasing-side coupling device CB to be brought into its released state to establish the newly selected AT gear position was placed in the engaged state before initiation of the shift-down action, while the engaging-side coupling device CB to be brought into its engaged state to establish the newly selected AT gear position was placed in the released state before initiation of the shift-down action. It is noted that the shift-down action from the second speed AT gear position "2nd" to the first speed AT gear position "1st" can also be implemented with the automatic engaging action of the one-way clutch F1 which takes place concurrently with the releasing action of the releasing-side coupling device CB in the form of the brake B1.

The collinear chart of FIG. 3 indicates a relationship among rotating speeds of the rotary elements of the continuously-variable transmission portion 18 and the step-variable transmission portion 20. In this collinear chart of FIG. 3, three vertical lines Y1, Y2 and Y3 corresponding to the respective three rotary elements of the differential mechanism 32 of the continuously-variable transmission portion 18 respectively represent a "g" axis representing the rotating speed of a second rotary element RE2 in the form of the sun gear S0, an "e" axis representing the rotating speed of a first rotary element RE1 in the form of the carrier CA0, and an "m" axis representing the rotating speed of a third rotary element RE3 in the form of the ring gear R0. Further, four vertical lines Y4, Y5, Y6 and Y7 corresponding to the respective four rotary elements of the step-variable transmission portion 20 respectively represent an axis representing the rotating speed of a fourth rotary element RE4 in the form of the sun gear S2, an axis representing the rotating speed of a fifth rotary element RE5 in the form of the ring gear R1 and the carrier CA2 fixed to each other, namely, the rotating speed of the output shaft 22, an axis representing the rotating speed of a sixth rotary element RE6 in the form of the carrier CA1 and the ring gear R2 fixed to each other, and an axis representing the rotating speed of a seventh rotary element RE7 in the form of the sun gear S1. The distances between the adjacent ones of the vertical lines Y1, Y2 and Y3 are determined by a gear ratio ρ0 of the differential mechanism 32, while the distances between the adjacent ones of the vertical lines Y4-Y7 are determined by gear ratios ρ1 and ρ2 of the respective first and second planetary gear sets 36 and 38. Where the distance between the axis representing the rotating speed of the sun gear S0, S1, S2 and the axis representing the rotating speed of the carrier CA0, CA1, CA2 corresponds to "1", the distance between the axis representing the rotating speed of the carrier CA0, CA1, CA2 and the axis representing the rotating speed of the ring gear R0, R1, R2 corresponds to the gear ratio ρ of the planetary gear set (=number of teeth Zs of the sun gear/number of teeth Zr of the ring gear).

Referring to the collinear chart of FIG. 3, the differential mechanism 32 of the continuously-variable transmission portion 18 is arranged such that the engine 14 (represented as "ENG" in the collinear chart) is connected to the first rotary element RE1, and the first motor/generator MG1 (represented as "MG1" in the collinear chart) is connected to the second rotary element RE2, while the second motor/generator MG2 (represented as "MG2" in the collinear chart) is connected to the third rotary element RE3 which is rotated together with the intermediate power transmitting member 30. Thus, a rotary motion of the engine 14 is transmitted to the step-variable transmission portion 20 through the intermediate power transmitting member 30. In a part of the collinear chart of FIG. 3 which corresponds to the continuously-variable transmission portion 18, straight lines L0 and L0R intersecting the vertical line Y2 represent a relationship between the rotating speeds of the sun gear S0 and the ring gear R0.

The step-variable transmission portion 20 is arranged such that the fourth rotary element RE4 is selectively connected to the intermediate power transmitting member 30 through the clutch C1, the fifth rotary element RE5 is connected to the output shaft 22, the sixth rotary element RE6 is selectively connected to the intermediate power transmitting member 30 through the clutch C2 and is selectively connected to the casing 16 through the brake B2, and the seventh rotary element RE7 is selectively connected to the casing 16 through the brake B1. In a part of the collinear chart which corresponds to the step-variable transmission portion 20, straight lines L1, L2, L3, L4 and LR intersecting the vertical line Y5 represent the rotating speeds of the output shaft 22 in the respective first, second, third and fourth speed AT gear positions "1st", "2nd", "3rd" and "4th", and a rear drive position "Rev".

Solid straight lines L0, L1, L2, L3 and L4 shown in the collinear chart of FIG. 3 indicate the relative rotating speeds of the rotary elements in a hybrid drive mode in which the vehicle 10 is driven in the forward direction with at least the engine 14 being operated as the drive power source. In the differential mechanism 32 placed in this hybrid drive mode, the engine torque Te is applied to the carrier CA0 while a reaction torque (i.e. regenerative torque) which is a negative torque generated by the first motor/generator MG1 is applied to the sun gear S0 so as to rotate the sun gear S0 in the positive direction. As a result, a directly transmitted engine torque Td ($=Te/(1+\rho 0)=-(1/\rho 0)\times Tg$) which is a positive torque is applied to the ring gear R0 so as to rotate the ring gear R0 in the positive direction. The vehicle 10 is driven in the forward direction with a vehicle drive torque which is a sum of the directly transmitted engine torque Td and the MG2 torque Tm and which is transmitted to the drive wheels 28 through the step-variable transmission portion 20 selectively placed in one of the first through fourth speed AT gear positions according to an operator-required vehicle drive force. At this time, the first motor/generator MG1 functions as an electric generator operated in the positive direction to generate a negative torque. An electric power Wg generated by the first motor/generator MG1 is stored in the battery 54 or consumed by the second motor/generator MG2. The second motor/generator MG2 is operated to generate the MG2 torque Tm, with all or a part of the electric power Wg generated by the first motor/generator MG1, or a sum of the generated electric power Wg and the electric power supplied from the battery 54.

In the differential mechanism 32 placed in a motor drive mode in which the vehicle 10 is driven with a drive force generated by the second motor/generator MG2 operated as the drive power source while the engine 14 is held at rest, the carrier CA0 is held stationary while the MG2 torque Tm which is a positive torque is applied to the ring gear R0 so as to rotate the ring gear R0 in the positive direction. At this time, the first motor/generator MG1 connected to the sun gear S0 is placed in a non-load state and freely operated in the negative direction. Namely, in the motor drive mode, the engine 14 is held in the non-operated state, so that the engine speed Ne is kept substantially zero, and the vehicle 10 is driven in the forward direction with the MG2 torque Tm (positive forward driving torque), which is transmitted as a forward drive torque to the drive wheels 28 through the step-variable transmission portion 20 placed in one of the first through fourth speed AT gear positions.

Broken straight lines L0R and LR shown in the collinear chart of FIG. 3 represent the relative rotating speeds of the various rotary elements of the continuously-variable and step-variable transmission portions 18 and 20 during running of the vehicle 10 in the rearward direction in the motor drive mode. During this running of the vehicle 10 in the rearward direction in the motor drive mode, the MG2 torque Tm which is a negative torque is applied to the ring gear R0 so as to rotate the ring gear R0 in the negative direction, and is transmitted as the rearward driving torque to the drive wheels 28 through the step-variable transmission portion 20 placed in the first speed AT gear position. The vehicle 10 can be driven in the rearward direction with the rearward driving MG2 torque Tm which is the negative torque generated by the second motor/generator MG2 under the control of the electronic control device 80 and which is opposite to the positive forward driving torque generated while the step-variable transmission portion 20 is placed in the forward low-speed AT gear position, for instance, in the first speed AT gear position "1st". The forward driving MG2 torque Tm is the positive vehicle driving torque for rotating the drive wheels 28 in the positive direction, while the rearward driving MG2 torque Tm is the negative vehicle driving torque for driving the drive wheels 28 in the negative direction. Thus, the vehicle 10 is driven in the rearward direction with the negative MG2 torque Tm generated while the step-variable transmission portion 20 is placed in the suitably selected forward driving AT gear position, which is also used to drive the vehicle 10 in the forward direction. In the hybrid drive mode, too, the second motor/generator MG2 can be operated in the negative direction, as indicated by the straight line L0R, so that the vehicle 10 can be driven in the rearward direction in the hybrid drive mode, as in the motor drive mode.

In the vehicular drive system 12, the continuously-variable transmission portion 18 functions as an electrically controlled transmission mechanism provided with the differential mechanism 32 the differential state of which is controlled by controlling the operating state of the first motor/generator MG1, and which has the three rotary elements, that is, the first rotary element RE1 in the form of the carrier CA0 to which the engine 14 is operatively connected in a power transmittable manner, the second rotary element RE2 in the form of the sun gear S0 to which the first motor/generator MG1 is operatively connected in a power transmittable manner, and the third rotary element RE3 in the form of the ring gear RD to which the intermediate power transmitting member 30 is operatively connected in a power transmittable manner. The third rotary element RE3 to which the intermediate power transmitting member 30 is connected may be considered to be the third rotary element RE3 to which the second motor/generator MG2 is operatively connected in a power transmittable manner. Namely, the continuously-variable transmission portion 18 provided in the vehicular drive system 12 has the differential mechanism 32 to which the engine 14 is operatively connected in a power transmittable manner, and the first motor/generator MG1 to which the differential mechanism 32 is operatively connected in a power transmittable manner such that the differential state of the differential mechanism 32 is controlled according to the operating state of the first motor/generator MG1. The continuously-variable transmission portion 18 is operated as an electrically controlled continuously-variable transmission a speed ratio γ0 ($=Ne/Nm$) of which is variable. The speed ratio is a ratio of the engine speed Ne equal to a rotating speed of the connecting shaft 34 (which is the input rotary member of the continuously-variable transmission portion 18), with respect to the MG2 speed Nm equal to the rotating speed of the intermediate power transmitting member 30 (which is the output rotary member of the continuously-variable transmission portion 18).

In the hybrid drive mode, for instance, the rotating speed of the sun gear S0 is raised or lowered by controlling an operating speed of the first motor/generator MG1 while the rotating speed of the ring gear R0 is determined by a rotating speed of the drive wheels 28 with the step-variable transmission portion 20 placed in one of the AT gear positions, so that the rotating speed of the carrier CA0 (namely engine speed Ne) is accordingly raised or lowered. In the hybrid drive mode, therefore, the engine 14 can be operated in an efficiently operating state. That is, the step-variable transmission portion 20 to be placed in a selected one of the AT gear positions and the continuously-variable transmission portion 18 functioning as a continuously-variable transmission cooperate to provide the transmission device 40 in which the continuously-variable transmission portion 18 and the step-variable transmission portion 20 are disposed in series with each other and which functions as a continuously-variable transmission as a whole.

Alternatively, the continuously-variable transmission portion 18 can be shifted like a step-variable transmission. Accordingly, the transmission device 40 constituted by the step-variable transmission portion 20 to be placed in one of the AT gear positions and the continuously-variable transmission portion 18 which can be shifted like the step-variable transmission can be shifted like a step-variable transmission as a whole. That is, the step-variable transmission portion 20 and the continuously-variable transmission portion 18 can be controlled to selectively establish a plurality of speed positions (hereinafter referred to as "overall speed positions") having respective different values of a speed ratio γt (=Ne/No) which is a ratio of the engine speed Ne to the output speed No. The speed ratio γt is an overall speed ratio of the transmission device 40 consisting of the continuously-variable transmission portion 18 and the step-variable transmission portion 20 which are disposed in series with each other. The overall speed ratio γt is equal to a product of the speed ratio γ0 of the continuously-variable transmission portion 18 and the speed ratio γat of the step-variable transmission portion 20, namely, γt=γ0×γat.

Figures 4, 5:
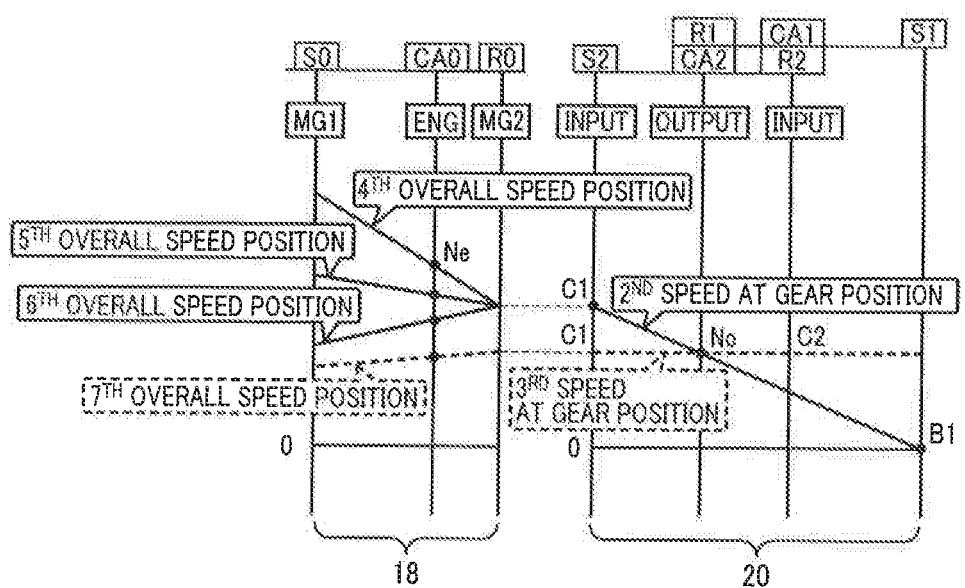
FIG. 4 is a table indicating an example of a plurality of overall speed positions of a transmission device in relation to the gear positions of the step-variable transmission portion.
FIG. 5 is a view indicating some examples of the gear positions of the mechanically operated step-variable transmission portion and some examples of the overall speed positions of the transmission device, on a collinear chart similar to that of FIG. 3.

At least one overall speed position is provided for each of the four AT gear positions of the step-variable transmission portion 20, with a combination of each AT gear position with at least one of the different speed ratio values γ0 of the continuously-variable transmission portion 18. FIG. 4 is the table indicating an example of the overall speed positions of the transmission device 40, wherein first through third overall speed positions are established for the first speed AT gear position, fourth through sixth overall speed positions are established for the second speed AT gear position, seventh through ninth overall speed positions are established for the third speed AT gear position, and a tenth overall speed position is established for the fourth speed AT gear position.

FIG. 5 is the view indicating some examples of the AT gear positions of the step-variable transmission portion 20 and some examples of the overall speed positions of the transmission device 40, on a collinear chart similar to that of FIG. 3. In the collinear chart of FIG. 5, solid lines indicate the fourth through sixth overall speed positions established when the step-variable transmission portion 20 is placed in the second speed AT gear position. In the transmission device 40, the continuously-variable transmission portion 18 is controlled to control the engine speed Ne with respect to the output speed No for establishing the predetermined overall speed ratio values γt, to thereby establish the overall speed position or positions for each of the AT gear positions. A broken line indicates the seventh overall speed position established when the step-variable transmission portion 20 is placed in the third speed AT gear position. In the transmission device 40, the continuously-variable transmission portion 18 is controlled according to the selected one of the AT gear positions, for shifting the transmission device 40 from one of the overall speed positions to another.

Referring back to FIG. 1, the vehicle 10 is provided with the control apparatus of the present invention in the form of the electronic control device 80 configured to control various devices of the vehicle 10 such as the engine 14, continuously-variable transmission portion 18 and step-variable transmission portion 20. FIG. 1 is the view showing input and output signals of the electronic control device 80, and is a functional block diagram showing major control functions and control portions of the electronic control device 80. For example, the electronic control device 80 is a so-called microcomputer incorporating a CPU, a ROM, a RAM and an input-output interface. The CPU performs various controls of the vehicle 10, by implementing various input signal processings, according to control programs stored in the ROM, while utilizing a temporary data storage function of the RAM. The electronic control device 80 may be constituted by two or more control units exclusively assigned to perform different controls such as engine controls and transmission shifting controls.

The electronic control device 80 receives various input signals such as: an output signal of an engine speed sensor 60 indicative of the engine speed Ne; an output signal of an MG1 speed sensor 62 indicative of an MG1 speed Ng which is the operating speed of the first motor/generator MG1; an output signal of an MG2 speed sensor 64 indicative of the MG2 speed Nm which is the AT input speed Ni; an output signal of an output speed sensor 66 indicative of the output speed No corresponding to the vehicle running speed V; an output signal of an accelerator pedal operation amount sensor 68 indicative of the operation amount θacc of a vehicle accelerating member in the form of the accelerator pedal; an output signal of a throttle valve opening angle sensor 70 indicative of an angle θth of opening of the above-indicated electronic throttle valve; an output signal of a brake pedal sensor 72 indicative of an operated state of the brake pedal by the vehicle operator; an output signal of a G sensor 74 indicative of a longitudinal acceleration value G of the vehicle 10; an output signal of a shift position sensor 76 indicative of a presently selected operating position POSsh of a shift lever 58; output signals of a battery sensor 78 indicative of a temperature THbat, a charging/discharging electric current Ibat and a voltage Vbat of the battery 54; and an output signal of an oil temperature sensor 79 indicative of a temperature THoil of a working fluid to be supplied to the hydraulic actuators of the coupling devices CB, namely, the working fluid used to switch each coupling device CB between its engaged and released states.

The operation amount θacc of the accelerator pedal provided as the vehicle accelerating member represents a degree of acceleration of the vehicle 10 required by the vehicle operator, and therefore a vehicle drive force or output which is required by the vehicle operator. This vehicle drive force or output may be represented by the angle θth of opening of the electronic throttle valve, an operator-required vehicle drive torque Tdem described below, etc., other than the operation amount θacc of the accelerator pedal.

The electronic control device 80 generates various output signals such as: engine control command signals Se to be applied to an engine control device 50, for controlling the engine 14; motor/generator control command signals Smg to be applied to the inverter 52, for controlling the first motor/generator MG1 and the second motor/generator MG2; and hydraulic control command signals Sat to be applied to the hydraulic control unit 56, for controlling the operating states of the coupling devices CB. The hydraulic control command signals Sat are command signals for controlling the solenoid-operated valves SL1-SL4 to regulate the engaging hydraulic pressures PRcb to be applied to the respective hydraulic actuators of the coupling devices CB, for shifting the step-variable transmission portion 20. The electronic control device 80 operates to set a hydraulic pressure command value corresponding to the engaging hydraulic pressure PRcb to be applied to each of the hydraulic actuators, for establishing a desired amount of the engaging torque Tcb of the corresponding coupling device CB, and applies to the hydraulic control unit 56 an electric current or voltage command signal corresponding to the hydraulic pressure command value.

The electronic control device 80 calculates a charged state value SOC[%] of the battery 54 (an amount of electric power stored in the battery 54) on the basis of the charging/discharging electric current; Ibat and the voltage Vbat of the battery 54. The electronic control device 80 also calculates a lower limit Win of a battery power Pbat below which the battery 54 can be charged, and an upper limit Wout above which the battery 54 can be discharged. These lower and upper limits Win and Wout are calculated on the basis of the battery temperature THbat and the charged state value SOC %, for example. Charging and discharging controls of the battery 54 are implemented such that the battery power Pbat is held within a range between the calculated lower and upper limits Win and Wout. The range between the lower and upper limits Win and Wout is narrowed as the battery temperature THbat is lowered below a lower limit of a normal operating range of the battery 54, or as the battery temperature THbat is raised above an upper limit of the normal operating range. The lower limit Win is decreased with an increase of the charged state value SOC above a predetermined upper limit, while the upper limit Wout is decreased with a decrease of the charged state value SOC below a predetermined lower limit.

The electronic control device 80 includes a shift control means in the form of a step-variable shifting control portion 82, and a hybrid control means in the form of a hybrid control portion 84, for implementing various controls of the vehicle 10.

The step-variable shifting control portion 82 is configured to determine a shifting action of the step-variable transmission portion 20 according to a memory-stored AT gear position shifting map obtained by experimentation or determined by an appropriate design theory, and to implement a shifting control for controlling the step-variable transmission portion 20 to perform the determined shifting action. In this shifting control, the step-variable shifting control portion 82 applies the hydraulic control command signals Sat to the hydraulic control unit 56, for commanding the solenoid-operated valves SL1-SL4 to bring the appropriate ones of the coupling devices CB into the released and engaged states, for automatically shifting up or down the step-variable transmission portion 20. The AT gear position shifting map indicated above represents a predetermined relationship between two variables in the form of the output speed No and the accelerator pedal operation amount θacc, which relationship is used to determine a shifting action of the step-variable transmission portion 20 and is represented by shift-up and shift-down shifting lines in a two-dimensional coordinate system in which the output speed No and the accelerator pedal operation amount θacc are taken along respective two axes. The output speed No may be replaced by the vehicle running speed V, and the accelerator pedal operation amount θacc may be replaced by an operator-required vehicle drive torque Tdem or the throttle valve opening angle θth. The shifting lines of the AT gear position shifting map consist of shift-up lines for determining shift-up actions of the step-variable transmission portion 20, and shift-down lines for determining shift-down actions of the step-variable transmission portion 20. Each of the shifting lines is defined by a series of shifting points which are determined such that the step-variable transmission portion 20 should be shifted up or down when the output speed No becomes higher or lower than the shifting point at a given value of the accelerator pedal operation amount θacc, or when the accelerator pedal operation amount θacc becomes larger or smaller than the shifting point at a given value of the output speed No.

The hybrid control portion 84 has a function of an engine control means or portion to control the engine 14, and a function of a motor/generator control means or portion to control the first motor/generator MG1 and the second motor/generator MG2 through the inverter 52. Thus, the hybrid control portion 84 performs hybrid drive controls for controlling the engine 14, first motor/generator MG1 and second motor/generator MG2. The hybrid control portion 84 is configured to calculate an operator-required vehicle drive power Pdem on the basis of the accelerator pedal operation amount θacc and the vehicle running speed V, and according to a predetermined relationship in the form of a drive force map, for instance. In other words, the hybrid control portion 84 calculates the operator-required vehicle drive torque Tdem at the present vehicle running speed V. The hybrid control portion 84 generates the engine control command signals Se to control the engine 14, and the motor/generator control command signals Smg to control the first motor/generator MG1 and the second motor/generator MG2, while taking account of the upper and lower limits Wout and Win, for establishing the operator-required vehicle drive power Pdem. For example, the engine control command signals Se represent an engine power Pe which is the torque Te of the engine 14 at its present operating speed Ne. For example, the motor/generator control command signals Smg represent the electric power Wg to be generated by the first motor/generator MG1 to generate the reaction torque with respect to the engine torque Te, namely, the MG1 torque Tg at the present MG1 speed Ng, and an electric power amount Win to be consumed by the second motor/generator MG2 to generate the MG2 torque Tm at the present MG2 speed Nm.

When the transmission device 40 as a whole is operated as the continuously-variable transmission while the continuously-variable transmission portion 18 is operated as the continuously-variable transmission, for instance, the hybrid control portion 84 controls the engine 14 and the electric power Wg to be generated by the first motor/generator MG1, so as to establish the engine speed Ne and the engine torque Te for obtaining the engine power Pe to establish the operator-required vehicle drive power Pdem, while taking account of a highest fuel economy point of the engine 14, so that the speed ratio γ0 of the continuously-variable transmission portion 18 is controlled so as to be continuously varied. As a result, the speed ratio γt of the transmission device 40 is controlled while the continuously-variable transmission portion 18 is operated as the continuously-variable transmission.

Where the transmission device 40 as a whole is shifted as a step-variable transmission while the continuously-variable transmission portion 18 is shifted as a step-variable transmission, the hybrid control portion 84 determines a shifting action of the transmission device 40 according to an overall speed position shifting map, and performs a shifting control of the continuously-variable transmission portion 18 to establish a selected one of the plurality of overall speed positions, in cooperation with the step-variable shifting control portion 82 to shift the step-variable transmission portion 20 selectively to the AT gear positions. The plurality of overall speed positions can be established by controlling the first motor/generator MG1 to control the engine speed Ne according to the output speed No so as to maintain the respective speed ratio values γt. Each of the speed ratio values γt of the overall speed positions need not be constant over the entire range of the output speed No, and may have different values in respective regions of the output speed No, or may be limited depending upon upper and lower limits of rotating speeds of various parts of the step-variable transmission portion 20. Thus, the hybrid control portion 84 can control the transmission device 40 so as to be shifted to the selected one of the overall speed positions by controlling the engine speed Ne.

Figure 6:
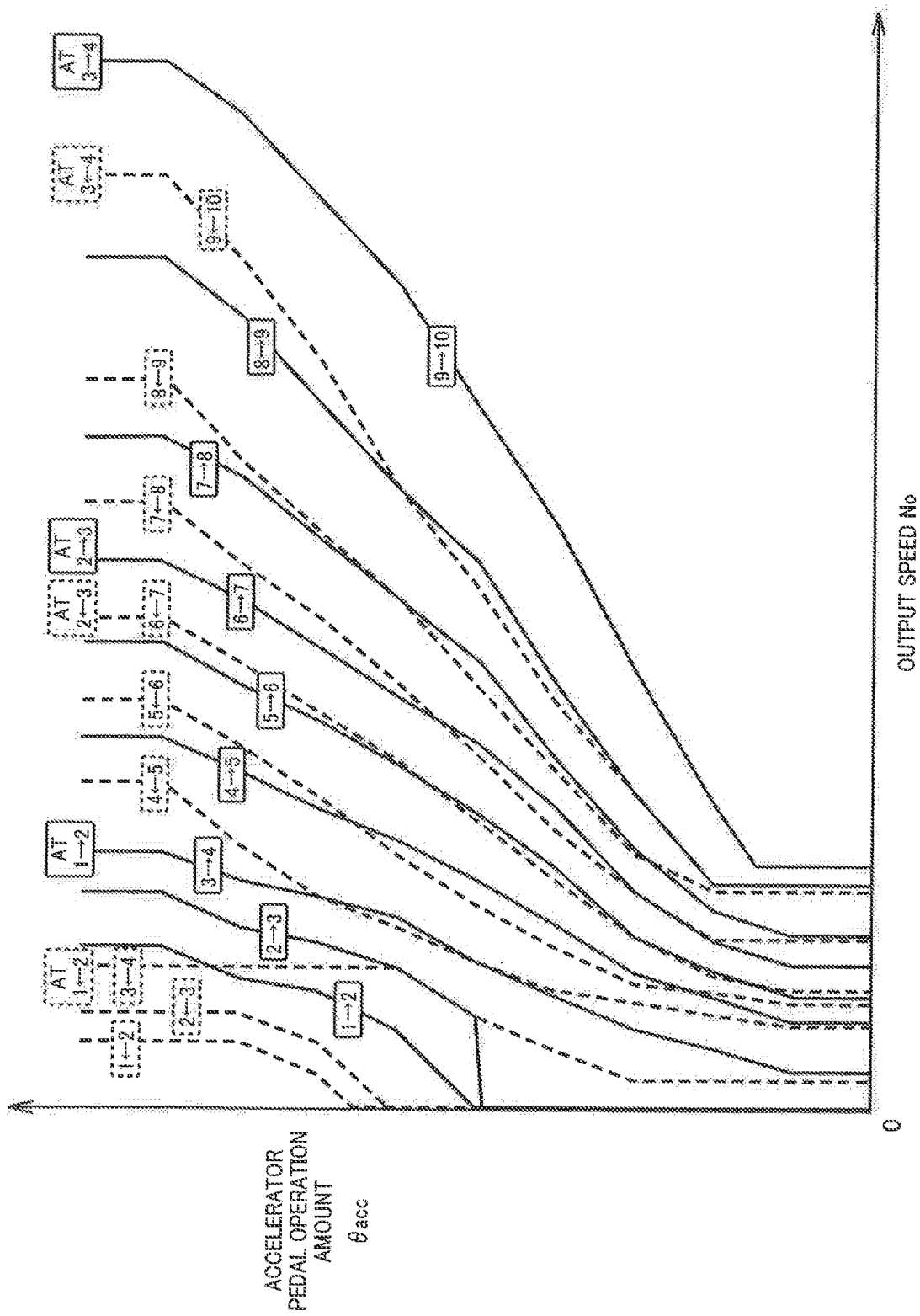
FIG. 6 is a view illustrating examples of an AT gear position shifting map and an overall speed position shifting map used to shift up and down the transmission device.

Like the AT gear position shifting map, the above-indicated overall speed position shifting map represents a predetermined relationship between the output speed No and the accelerator pedal operation amount θacc. FIG. 6 shows an example of the overall speed position shifting map. In FIG. 6, solid lines indicate shift-up boundary lines while broken lines indicate shift-down boundary lines. The transmission device 40 consisting of the continuously-variable transmission portion 18 and the step-variable transmission portion 20 which are disposed in series with each other is shifted from one of the overall speed positions to another according to the overall speed position shifting map, as if the transmission device 40 was shifted like a step-variable transmission as a whole. This overall step-variable shifting control to control the shifting actions of the transmission device 40 as the step-variable transmission as a whole may be implemented preferentially to the continuously-variable shifting control of the transmission device 40 as the continuously-variable transmission as a whole, only when a sporty drive mode or any other high-drivability drive mode is selected by the vehicle operator, or only when the operator-required vehicle drive torque Tdem is comparatively large, but may be principally implemented except where the overall step-variable shifting control is restricted or inhibited.

The overall speed position shifting control by the hybrid control portion 84 and the step-variable shifting control by the step-variable shifting control portion 82 are implemented in cooperation with each other. In this embodiment, the ten overall speed positions, that is, the first through tenth overall speed positions are established for the four AT gear positions, that is, the first through fourth speed AT gear positions. The AT gear position shifting map is defined such that an AT gear position shifting operation is performed in synchronization with an overall speed position shifting operation. Described more specifically, the shift-up lines for shifting up the transmission device 40 from the third overall speed position to the fourth overall speed position (3→4), from the sixth overall speed position to the seventh overall speed position (6→7), and from the ninth overall speed position to the tenth overall speed position (9→10) are respectively coincident with the shift-up lines for shifting up the step-variable transmission portion 20 from the first speed AT gear position to the second speed AT gear position (1→2), from the second speed AT gear position to the third speed. AT gear position (2→3), and from the third speed AT gear position to the fourth speed AT gear position (3→4). For instance, the overall speed position shift-up line 3→4 is coincident with the AT gear position shift-up line AT1→2, as indicated in FIG. 6. Further, the shift-down lines for shifting down the transmission device 40 from the fourth overall speed position to the third overall speed position (3←4), from the seventh overall speed position to the sixth overall speed position (6←7), and from the tenth overall speed position to the ninth overall speed position (9←10) are respectively coincident with the shift-down lines for shifting down the step-variable transmission portion 20 from the second speed. AT gear position to the first speed AT gear position (1←2), from the third speed AT gear position to the second speed AT gear position (2←3), and from the fourth speed AT gear position to the third speed AT gear position (3←4). For instance, the overall speed position shift-down line 3←4 is coincident with the AT gear position shift-down line AT1←2, as also indicated in FIG. 6. Alternatively, a command to shift the step-variable transmission portion 20 may be applied to the step-variable shifting control portion 82 in response to a determination according to the overall speed position shifting map of FIG. 6 that the transmission device 40 should be shifted from one overall speed position to another. Thus, a shift-up action of the transmission device 40 as a whole takes place upon a shift-up action of the step-variable transmission portion 20, and a shift-down action of the transmission device 40 as a whole takes place upon a shift-down action of the step-variable transmission portion 20. The step-variable shifting control portion 82 commands the step-variable transmission portion 20 to perform a shifting action from one AT gear position to another, for shifting the transmission device 40 from one overall speed position to another. Since the AT gear position shifting operation is performed in synchronization with the overall speed position shifting operation, the shifting action of the step-variable transmission portion 20 is performed with a change of the engine speed Ne, so that the vehicle operator is less likely to uncomfortably recognize a shifting shock of the step-variable transmission portion 20.

The hybrid control portion 84 selectively establishes the motor drive mode or the hybrid drive mode, depending upon the running state of the vehicle 10. For example, the hybrid control portion 84 selects the motor drive mode when the operator-required vehicle drive power Pdem is lower than a predetermined threshold value, that is, within a predetermined motor drive mode range, and selects the hybrid drive mode when the required vehicle drive power Pdem is equal to or higher than the threshold value, that is, within a predetermined hybrid drive mode range. Further, even when the required vehicle drive power Pdem is within the motor drive mode range, the hybrid control portion 84 selects the hybrid drive mode if the electric power amount SOC stored in the battery 54 is smaller than a predetermined engine-starting threshold value. In the motor drive mode, the vehicle 10 is driven with a drive torque generated by the second motor/generator MG2 while the engine 14 is held at rest. In the hybrid drive mode, the engine 14 is operated as needed. The engine-starting threshold value indicated above is predetermined as a lower limit of the electric power amount SOC below which the battery 54 should be charged by starting the engine 14.

The overall speed position shifting control of the transmission device 40 implemented upon a shifting action of the step-variable transmission portion 20 will be described in detail. To implement the overall speed position shifting control of the transmission device 40 upon the shifting action of the step-variable transmission portion 20, the hybrid control portion 84 includes: a target value setting means in the form of a target value setting portion 86 a feedback control means in the form of a feedback control portion 88; a target input torque setting means in the form of a target input torque setting portion 90; and an input torque resetting control means in the form of an input torque resetting control portion 92. The electronic control device 80 further includes a state determining means in the form of a state determining portion 94.

The target value setting portion 86 is configured to set a target value of an MG2 speed change rate dNm/dt which is a rate of change of the MG2 speed Nm, namely, a rate of change of the AT input speed Ni, during an inertia phase of a shifting action of the step-variable transmission portion 20 controlled by the step-variable shifting control portion 82. The target value setting portion 86 sets, from time to time, the target value of the MG2 speed change rate dNm/dt such that the MG2 speed Nm changes in a predetermined pattern toward a post-shifting synchronization speed to be established after completion of the shifting action of the step-variable transmission portion 20. This MG2 speed change rate dNm/dt is representative of a state of rotation of the input rotary member of the step-variable transmission portion 20. The target value setting portion 86 is also configured to set a target value of an engine speed change rate dNe/dt which is a rate of change of the engine speed Ne, during the inertia phase of the shifting action of the step-variable transmission portion 20 controlled by the step-variable shifting control portion 82. The target value setting portion 86 sets, from time to time, the target value of the engine speed change rate dNe/dt such that the engine speed Ne changes in a predetermined pattern toward a target value to be established after completion of the shifting action of the step-variable transmission portion 20. This engine speed change rate dNe/dt represents a state of operation of the engine 14. As described above, the AT gear position shifting operation is performed in synchronization with the overall speed position shifting operation, so that the target value of the engine speed Ne to be established after completion of the shifting action of the step-variable transmission portion 20 is considered equal to a post-shifting synchronization value of the engine speed Ne to be established after the overall speed position shifting operation of the transmission device 40. In the following description of the present embodiment, the post-shifting synchronization value of the MG2 speed Nm to be established after completion of the shifting action of the step-variable transmission portion 20 will be represented by "Nmsyca" (=No×γata). The value γata is a speed ratio of the step-variable transmission portion 20 in its AT gear position established after its shifting action. Further, the target value of the MG2 speed change rate dNm/dt will be represented by "dNmtgt", while the target value of the engine speed change rate dNe/dt will be represented by "dNetgt".

The feedback control portion 88 is configured to implement feedback controls of the MG1 torque Tg and the MG2 torque Tm in the process of a shifting action of the step-variable transmission portion 20, that is, during the inertia phase of the shifting action, on the basis of the engine torque Te and the transmission torque of the step-variable transmission portion 20, such that the MG2 speed change rate dNm/dt and the engine speed change rate dNe/dt coincide with the respective target values dNmtgt and dNetgt set by the target value setting portion 86. A sum of the MG2 torque Tm, and the directly transmitted engine torque Td transmitted to the ring gear R0 due to the MG1 torque Tg acting as a reaction torque with respect to the engine torque Te is equal to the AT input torque Ti of the step-variable transmission portion 20. Accordingly, the control of the MG1 torque Tg and the MG2 torque Tm is considered equivalent to the control of the AT input torque Ti.

The step-variable transmission portion 20 has four types of shifting action: a power-on shift-up action in a power-on state of the vehicle 10; a power-on shift-down action in the power-on state of the vehicle 10; a power-off shift-up action in a power-off state of the vehicle 10; and a power-off shift-down action in the power-off state of the vehicle 10. The power-on shifting action is required due to an increase of the accelerator pedal operation amount θacc, or due to a rise of the vehicle running speed V in an operated state of the accelerator pedal, for example. On the other hand, the power-off shifting action is required due to a decrease of the accelerator pedal operation amount θacc, or due to a decrease of the vehicle running speed V in the non-operated state of the accelerator pedal or in the state that the accelerator pedal operation amount θacc is kept at a value low enough to cause deceleration of the vehicle 10. If the AT input speed Ni and the MG2 speed Nm are not controlled, the AT input speed Ni (=MG2 speed Nm) increases in the process of the power-on shifting action, and the MG2 speed Nm decreases in the process of the power-off shifting action, while a torque is not transmitted through both of the engaging-side and releasing-side coupling devices CB for the shifting action. In the power-on shift-up action and the power-off shift-down action in which the MG2 speed Nm cannot be changed toward the post-shifting synchronization speed Nmsyca, without the control of the MG2 speed Nm, therefore, it is desirable that a torque is transmitted through the engaging-side coupling device CB to be brought into its engaged state to establish the selected AT gear position, to permit a rapid process of the shifting action. In the power-off shift-up action and the power-on shift-down action in which the MG2 speed Nm can be changed toward the post-shifting synchronization speed Nmsyca, without the control of the MG2 speed Nm, on the other hand, it is desirable that a torque to be transmitted through the releasing-side coupling device CB placed in the engaged state before the shifting action is reduced to permit the rapid process of the shifting action. Thus, in the power-on shift-up action and the power-off shift-down action, the engaging-side coupling device CB is a shifting-progressing coupling device the transmission torque of which is controlled to achieve the rapid process of the shifting action. In the power-off shift-up action and the power-on shift-down action, on the other hand, the releasing-side coupling device CB is the shifting-progressing coupling device. The shifting-progressing coupling device is one of the releasing-side and engaging-side coupling devices CB the torque of which is controlled to achieve the rapid progress of the shifting action of the step-variable transmission portion 20.

Described more specifically, the feedback control portion 88 calculates the MG1 torque Tg and the MG2 torque Tm, on the basis of the target value dNmtgt of the MG2 speed change rate dNm/dt, the target value dNetgt of the engine speed change rate dNe/dt, the engine torque Te, and an AT transmission torque Tat (described below), and according to the following mathematical equation (1). The feedback control portion 88 applies to the inverter 52 the motor/generator control command signals Smg for establishing the calculated MG1 torque Tg and MG2 torque Tm. For instance, the following mathematical equation (1) is derived from kinetic equations of inertia, speed change rate and torque values along or on the "g", "e" and "m" axes of the continuously-variable transmission portion 18 in the collinear chart of FIG. 3, and relationship equations based on the degree of freedom of the continuously-variable transmission portion 18 that the rotating speeds on two of the three axes "g", "e" and "m" determine the rotating speed on the remaining one of those three axes. Accordingly, each of values a11, . . . , a22, b11, . . . , b22, c11, . . . , and c22 in each of 2×2 matrices is determined by a combination of the inertia of each rotary member of the continuously-variable transmission portion 18, gear ratio ρ0 of the differential mechanism 32, etc.

MathematicalEquation $$\begin{bmatrix} a_{11} & a_{12} \\ a_{12} & a_{22} \end{bmatrix} \begin{bmatrix} \dot{N}_m \\ \dot{N}_e \end{bmatrix} = \begin{bmatrix} b_{11} & b_{12} \\ b_{21} & b_{22} \end{bmatrix}$$

$$\begin{bmatrix} T_m \\ T_g \end{bmatrix} + \begin{bmatrix} c_{11} & c_{12} \\ c_{21} & c_{22} \end{bmatrix} \begin{bmatrix} T_e \\ T_{at} \end{bmatrix} \quad (1)$$

$$\left( \dot{N}_m = \frac{dN_m}{dt}, \dot{N}_e = \frac{dN_e}{dt} \right)$$

In the above mathematical equation (1), the target values dNmtgt and dNetgt are used as the respective MG2 speed change rate dNm/dt and engine speed change rate dNe/dt. For example, the target value setting portion 86 sets the target MG2 speed change rate value dNmtgt and the target engine speed change rate value dNetgt, such that the MG2 speed Nm and the engine speed Ne change in desired or predetermined manners during the inertia phase of a relevant shifting action of the step-variable transmission portion 20. The target value setting portion 86 sets the target MG2 and engine speed change rate values dNmtgt and dNetgt, depending upon the relevant type of shifting action of the step-variable transmission portion 20, the relevant two AT gear positions between which the shifting action will take place, the relevant two overall speed positions between which the transmission device 40 will take place, a specific operating state of the engine 14, and any other conditions. Therefore, the feedback control portion 88 may be considered to implement a feedback control of the AT input torque Ti in the process of the shifting action of the step-variable transmission portion 20, such that the MG2 speed Nm changes in the desired manner during the inertia phase of the shifting action, in other words, such that the MG2 speed change rate dNm/dt coincides with the target value dNmtgt so that the MG2 speed Nm changes toward the post-shifting synchronization value Nmsyca. In the present embodiment, this feedback control implemented by the feedback control portion 88 during the inertia phase of the shifting action may also be called an "MG2 speed feedback control".

For instance, the engine torque Te in the mathematical equation (1) is a value to be generated at the engine speed Ne at which the engine power Pe for establishing the operator-required vehicle drive power Pdem is obtained.

The AT transmission torque Tat in the mathematical equation (1) is a sum of the torques required to be transmitted through the relevant releasing-side and engaging-side coupling devices CB in the process of the shifting action of the step-variable transmission portion 20, which sum is converted into a torque value acting on the intermediate power transmitting member 30, namely, a value of the torque to be transmitted through the step-variable transmission portion. 20, which value is converted into the torque value acting on the intermediate power transmitting member 30. Since the above mathematical equation (1) is a model equation for permitting a rapid progress of the shifting action of the step-variable transmission portion 20, the torque to be transmitted through the shifting-progressing engaging-side coupling device CB primarily serving to permit the rapid progress of the shifting action, which torque is converted into the torque value acting on the intermediate power transmitting member 30, is used as the AT transmission torque Tat in the mathematical equation (1) in the present embodiment. This transmission torque of the shifting-progressing engaging-side coupling device CB used as the AT transmission torque Tat in the mathematical equation (1) is a feed-forward value.

For example, the step-variable shifting control portion 82 sets the transmission torque of the shifting-progressing coupling device CB, so as to obtain a good balance between reduction or prevention of the shifting shock and reduction of a required shifting time of the step-variable transmission portion 20, on the basis of a target input torque value Titgt corresponding to the operator-required vehicle drive power Pdem, and according to a specific one of different relationships predetermined for respective different kinds of shifting action of the step-variable transmission portion 20 as represented by the specific type of shifting action and the relevant two AT gear positions between which the shifting action will take place.

The target input torque setting portion 90 sets the target input torque Titgt corresponding to the accelerator pedal operation amount θacc. Described more specifically, the operator-required vehicle drive power Pdem and the operator-required vehicle drive torque Tdem are calculated on the basis of the accelerator pedal operation amount θacc, and a change of the accelerator pedal operation amount θacc directly reflects on those vehicle drive power and torque Pdem and Tdem. To reduce an amount of change of the target input torque Titgt due to a change of the accelerator pedal operation amount θacc, it is appropriate or preferable to use, as the target input torque Titgt, a smoothed value of an operator-required input torque value Tidem which is the operator-required vehicle drive torque Tdem as converted into a torque acting on the intermediate power transmitting member 30. The target input torque setting portion 90 sets, as the operator-required input torque value Tidem, the operator-required vehicle drive torque Tdem corresponding to the accelerator pedal operation amount θacc, which drive torque Tdem is converted into the torque acting on the intermediate power transmitting member 30. The target input torque setting portion 90 sets, as the target input torque Titgt, the smoothed value of the operator-required input torque value Tidem corresponding to the accelerator pedal operation amount θacc.

The feedback control portion 88 terminates the MG2 speed feedback control (AT input torque feedback control) when the MG2 speed Nm has become equal to the post-shifting synchronization value Nmsyca during the inertia phase of the shifting action of the step-variable transmission portion 20. In the MG2 speed feedback control implemented by the feedback control portion 88, the AT input torque Ti is controlled so as to establish the target MG2 speed change rate dNmtgt and the target engine speed change rate dNetgt. In other words, the AT input torque Ti is controlled by implementing a feedback control for compensation of the target input torque Titgt. Accordingly, there is a possibility that the AT input torque Ti deviates from the target input torque Titgt upon termination of the MG2 speed feedback control. In this event, the AT input torque Ti deviating from the target value Titgt is reset to the target value Titgt after the MG2 speed Nm has become equal to the post-shifting synchronization value Nmsyca.

When the MG2 speed Nm has become equal to the post-shifting synchronization value Nmsyca as a result of the MG2 speed feedback control (AT input torque feedback control), the input torque resetting control portion 92 implements an AT input torque resetting control to gradually change the AT input torque Ti toward the target value Titgt at a predetermined rate Rti, so that the AT input torque Ti deviating from the target value Titgt is reset to the target value Titgt. To reset the AT input torque Ti to the target value Titgt, the input torque resetting control portion 92 controls the MG1 torque Tg and the MG2 torque Tm. When the AT input torque Ti has become coincident with the target value Titgt, that is, has been reset to the target value Titgt, the input torque resetting control portion 92 terminates the AT input torque resetting control. Where the target input torque Titgt is larger than the AT input torque Ti upon initiation of the AT input torque resetting control, the rate Rti has a positive value. Where the target input torque Titgt is smaller than the AT input torque Ti upon initiation of the AT input torque resetting control, on the other hand, the rate Rti has a negative value. The AT input torque resetting control by the input torque resetting control portion 92 corresponds to the input torque resetting control of the present invention.

For example, the input torque resetting control portion 92 sets the rate Rti on the basis of the type of shifting action of the step-variable transmission portion 20 performed immediately before initiation of the AT input torque resetting control, and the relevant two AT gear positions of this shifting action. The predetermined rate Rti is a predetermined rate dTi/dt of change of the AT input torque Ti, which permits a good compromise or balance between rapid resetting of the AT input torque Ti to the target value Titgt within a predetermined length of time and reduction of the shifting shock. This predetermined length of time is a predetermined permissible maximum length of time required to reset the AT input torque Ti to the target value Titgt. It is noted that relatively high and low values of the rate Rti are considered to be respectively equivalent to relatively large and small magnitudes of the rate dTi/dt of change of the AT input torque Ti.

The state determining portion 94 is configured to determine whether the MG2 speed Nm during the inertia phase of the shifting action of the step-variable transmission portion 20 is equal to the post-shifting synchronization value Nmsyca, in the process of the shift-down action of the step-variable transmission portion 20, for instance.

Figure 7:
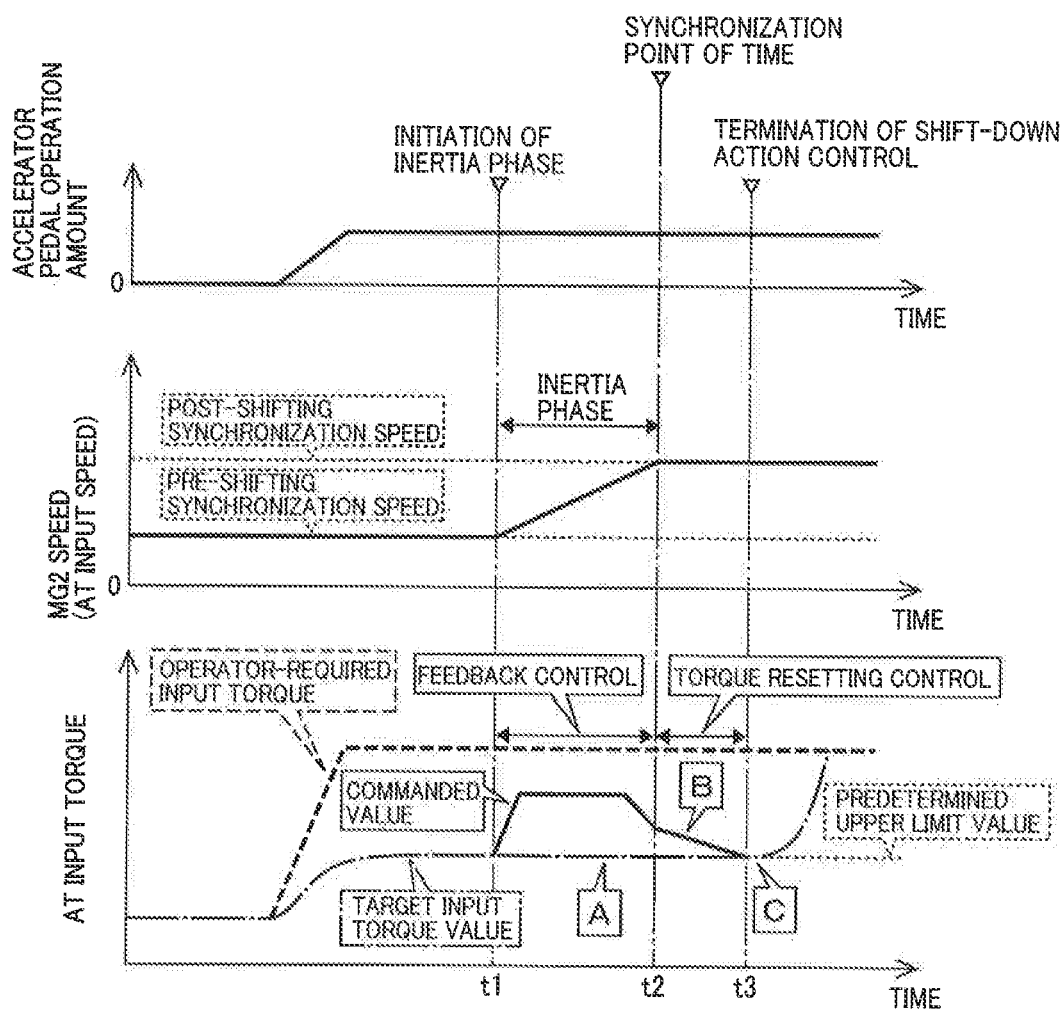
FIG. 7 is a time chart illustrating an example of changes of various parameters when an transmission input torque feedback control and an input torque resetting control of the step-variable transmission portion are implemented upon a vehicle-operator's requirement for acceleration of the vehicle in the process of a power-off shift-down action of the step-variable transmission portion.

FIG. 7 is the time chart illustrating an example of changes of various parameters when the MG2 speed feedback control and the AT input torque resetting control are implemented upon an increase of the amount θacc of operation of the accelerator pedal by the vehicle operator for acceleration of the vehicle 10 in the process of a power-off shift-down action of the step-variable transmission portion 20. As indicated in FIG. 7, the operator-required input torque value Tidem (AT input torque Ti indicated by a broken line in FIG. 7) is increased as a result of an operation of the accelerator pedal. To reduce the risk of generation of the previously described backlash-elimination shock upon completion of the shift-down action, however, the amount of increase of the target AT input torque value Titgt (AT input torque Ti indicated by a one-dot chain line in FIG. 7) is restricted with respect to the amount of increase of the operator-required input torque value Tidem, so as to keep the target value Titgt not larger than a predetermined upper limit value Ti1 until the AT input torque resetting control is terminated, as indicated by a mark "A" in FIG. 7. As the shift-down progresses, the inertia phase is initiated at a point of time t1, and the AT input torque Ti is feedback-controlled during the inertia phase. A command value of the AT input torque Ti (AT input torque Ti indicated by a solid line) is coincident with the target value Titgt before the moment of initiation of the inertia phase, and is feedback-controlled so as to deviate from the target value Titgt during the inertia phase. After the MG2 speed Nm has been raised to the post-shifting synchronization value Nmsyca, the AT input torque resetting control is implemented so that the AT input torque Ti which has deviated from the target value Titgt is gradually lowered toward the target value Titgt (during a time period between points of time t2 and t3), as indicated by a mark "B". When the AT input torque Ti has been reset to the target value Titgt, the AT input torque resetting control is terminated (at the point of time t3). After the AT input torque resetting control is terminated, the target AT input torque Titgt is gradually increased toward the operator-required AT input torque value Tidem, as indicated by a mark "C", in order to meet the operator's requirement to accelerate the vehicle 10, while reducing the risk of generation of the backlash-elimination shock.

As described above, the feedback control portion 88 implements the feedback control of the AT input torque Ti by feedback compensation of the target value Titgt during the inertia phase of the shift-down action of the step-variable transmission portion 20, such that the MG2 speed change rate dNm/dt coincides with the target value dNmtgt at which the MG2 speed Nm changes toward the post-shifting synchronization value Nmsyca.

The input torque resetting control portion 92 is configured to implement the AT input torque resetting control when the state determining portion 94 has determined that the MG2 speed Nm has been become equal to the post-shifting synchronization value Nmsyca.

Where the accelerator pedal operation amount θacc is increased in the process of the power-off shift-down action, the target input torque setting portion 90 restricts an amount of increase of the target input torque value Titgt with respect to an amount of increase of the operator-required input torque value Tidem as a result of the increase of the accelerator pedal operation amount θacc, such that the target input torque value Titgt is not larger than the predetermined upper limit value Ti1 until the AT input torque resetting control is terminated. For instance, the predetermined upper limit value Ti1 is an upper limit of the target input torque value Titgt at or below which the backlash-elimination shock after completion of the shift-down action is not likely to be generated, namely, the risk of generation of the backlash-elimination shock is reduced. In the process of rise of the target input torque value Titgt from the value in the non-operated state of the accelerator pedal to the predetermined upper limit value Ti1, the vehicle 10 may be switched from its non-driven state in which the AT input torque Ti has a negative value, to its driven state in which the AT input torque Ti has a positive value. In this respect, it is noted that a rate of rise of the target input torque value Titgt is a smoothed value of a rate of increase of the operator-required input torque value Tidem, and the predetermined upper limit value Ti1 is a small value. Accordingly, the limitation of the target input torque Titgt to the upper limit value permits the reduction of the risk of generation of the backlash-elimination shock while the vehicle 10 is switched from its non-driven state to its driven state.

Further, the target input torque setting portion 90 is configured to gradually change the target input torque value Titgt toward the operator-required input torque value Tidem, after the moment of termination of the AT input torque resetting control.

As shown in FIG. 7, the command value of the AT input torque Ti during the inertia phase of the shift-down action is reduced with a decrease of the MG2 speed. Nm toward the post-shifting synchronization value Nmsyca, so that the risk of generation of the backlash-elimination shock after completion of the shift-down action is further reduced. Namely, the hybrid control portion 84 further includes an actual input torque reducing means in the form of an actual input torque reducing portion 96 configured to reduce the actual AT input torque Ti with the decrease of the MG2 speed Nm toward the post-shifting synchronization value Nmsyca, while the AT input torque Ti is larger than the target value Titgt during the inertia phase in the process of the shift-down action of the step-variable transmission portion 20. Accordingly, as a result of the MG2 speed feedback control implemented by the feedback control portion 88, the AT input torque Ti is limited to or below the value to which it is reduced by the actual input torque reducing portion 96.

By the way when the accelerator pedal operation amount θacc is increased in the process of the power-off shift-down action of the step-variable transmission portion 20, it is desirable to rapidly complete the shift-down action, for thereby improving a control response to the operator's requirement for acceleration of the vehicle 10. However, the AT input torque Ti is controlled so as to coincide with the target value Titgt, while the MG2 speed feedback control and the AT input torque resetting control are not implemented, so that the limitation or restriction of the increase of the target value Titgt to or below the predetermined upper limit value Ti1 to reduce the risk of generation of the backlash-elimination shock results in delaying the initiation of the inertia phase and deterioration of the control response to the operator's requirement for acceleration of the vehicle 10, where the accelerator pedal operation amount θacc is increased prior to the moment of initiation of the inertia phase of the shift-down action. It is desirable to improve the control response to the operator's requirement for acceleration of the vehicle 10 while permitting the reduction of the risk of generation of the backlash-elimination shock.

The hybrid control portion 84 further includes an actual input torque increasing means in the form of an actual input torque increasing portion 98, to improve the control response to the operator's requirement for acceleration of the vehicle 10 while permitting the reduction of the risk of generation of the backlash-elimination shock.

The state determining portion 94 is configured to determine whether the step-variable transmission portion 20 is in the process of a power-off shift-down action. This determination is made on the basis of the hydraulic control command signals Sat. After the state determining portion 94 has determined that the step-variable transmission portion 20 is in the process of the power-off shift-down action, the state determining portion 94 determines whether the accelerator pedal is further operated, that is, whether the accelerator pedal operation amount θacc is increased prior to the moment of initiation of the inertia phase of the shift-down action.

If the state determining portion 94 determines that the accelerator pedal operation amount θacc is increased prior the moment of initiation of the inertia phase of the power-off shift-down action of the step-variable transmission portion 20, the actual input torque increasing portion 98 implements an input torque increasing control to control the AT input torque Ti so as to be larger than the target value Titgt, prior to the moment of initiation of the inertia phase of the shift-down action.

Where the vehicle 10 is switched from its non-driven state to its driven state in the process of the input torque increasing control, there is a risk of generation of the backlash-elimination shock of the step-variable transmission portion 20. When the transmission torque Tat of the step-variable transmission portion 20 is relatively small or zero, the risk of generation of the backlash-elimination shock as a result of switching of the vehicle 10 from the non-driven state to the driven state as a result of the increase of the AT input torque Ti is relatively low. In the input torque increasing control implemented by the actual input torque increasing portion 98, the step-variable shifting control portion 82 applies to the hydraulic control unit 56 the hydraulic control command signal Sat to reduce the engaging torque Tcb of the releasing-side coupling device CB before increasing the engaging torque Tcb of the engaging-side coupling device CB in the process of the shift-down action. That is, the step-variable shifting control portion 82 reduces the command value of the engaging hydraulic pressure PRcb of the releasing-side coupling device CB at an earlier point of time when the input torque increasing control is implemented, than when the input torque increasing control is not implemented, namely, than when normal clutch-to-clutch shifting controls of the engaging-side and releasing-side coupling devices CB are implemented. The above-indicated "increasing the engaging torque Tcb of the engaging-side coupling device CB" is interpreted to mean the increase of the engaging torque Tcb of the engaging-side coupling device CB from zero or a small value close to zero.

When the command value of the engaging hydraulic pressure PRcb of the releasing-side coupling device CB is reduced by the step-variable shifting control portion 82 at the earlier point of time as described above, the state determining portion 94 determines that the command value of the engaging hydraulic pressure PRcb of the releasing-side coupling device CB has been reduced to or below a predetermined value at which the engaging torque Tcb of the releasing-side coupling device CB is zero or substantially zero.

When the state determining portion 94 has determined that the accelerator pedal operation amount θacc is increased before the moment of initiation of the inertia phase of the power-off shift-down action of the step-variable transmission portion 20 and that the command value of the engaging hydraulic pressure PRcb of the releasing-side coupling device CB, which is reduced earlier, has been reduced to the predetermined value, the actual input torque increasing portion 98 implements the input torque increasing control.

Where an amount of increase of the accelerator pedal operation amount θacc is relatively small, a failure or insufficiency of improvement of the control response to the operator's required acceleration of the vehicle 10 is not considered to be a serious problem. In this respect, the input torque increasing control may be implemented only when the amount of increase of the accelerator pedal operation amount θacc is relatively large. The state determining portion 94 is further configured to determine whether the accelerator pedal operation amount θacc is increased by an amount not smaller than a predetermined value θacc1. The actual input torque increasing portion 98 implements the input torque increasing control when the state determining portion 94 determines that the amount of increase of the accelerator pedal operation amount θacc is equal to or larger than the predetermined value θacc1. This predetermined value θacc1 is a threshold value above which deterioration of the control response to the operator's requirement for acceleration of the vehicle 10 is considered to be a serious problem.

When the working fluid has a low temperature THoil at which a hydraulic pressure control response in the process of switching actions of the coupling devices CB is deteriorated, a balance between the engaging torque Tcb of the coupling device CB and the AT input torque Ti is lost, and the control response of the shift-down action of the step-variable transmission portion 20 may be deteriorated. In this respect, it is desirable not to implement the input torque increasing control when the temperature THoil of the working fluid is relatively low. In the present embodiment, the actual input torque increasing portion 98 is configured to implement the input torque increasing control only when the working fluid temperature THoil is not lower than a predetermined value THoil1. This predetermined value THoil1 is a lower limit of the working fluid temperature THoil above which the hydraulic pressure control response is considered to be satisfactory.

Figure 8:
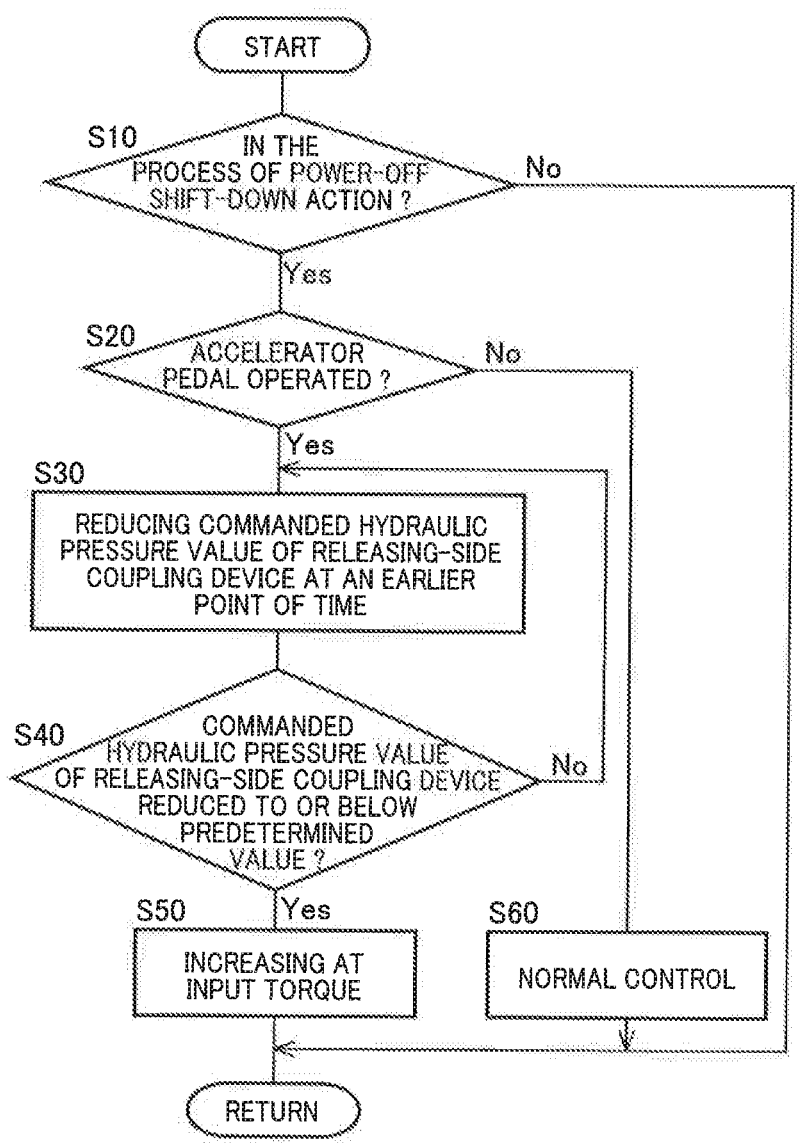
FIG. 8 is a flow chart illustrating a major control operation of an electronic control device provided to control the vehicle, namely, a control routine executed to improve a control response to the operator's vehicle acceleration requirement upon an increase of an operation amount of an accelerator pedal in the process of the power-off shift-down action of the step-variable transmission portion, while reducing a risk of generation of a so-called "backlash-elimination shock" of the step-variable transmission portion.
Figure 9:
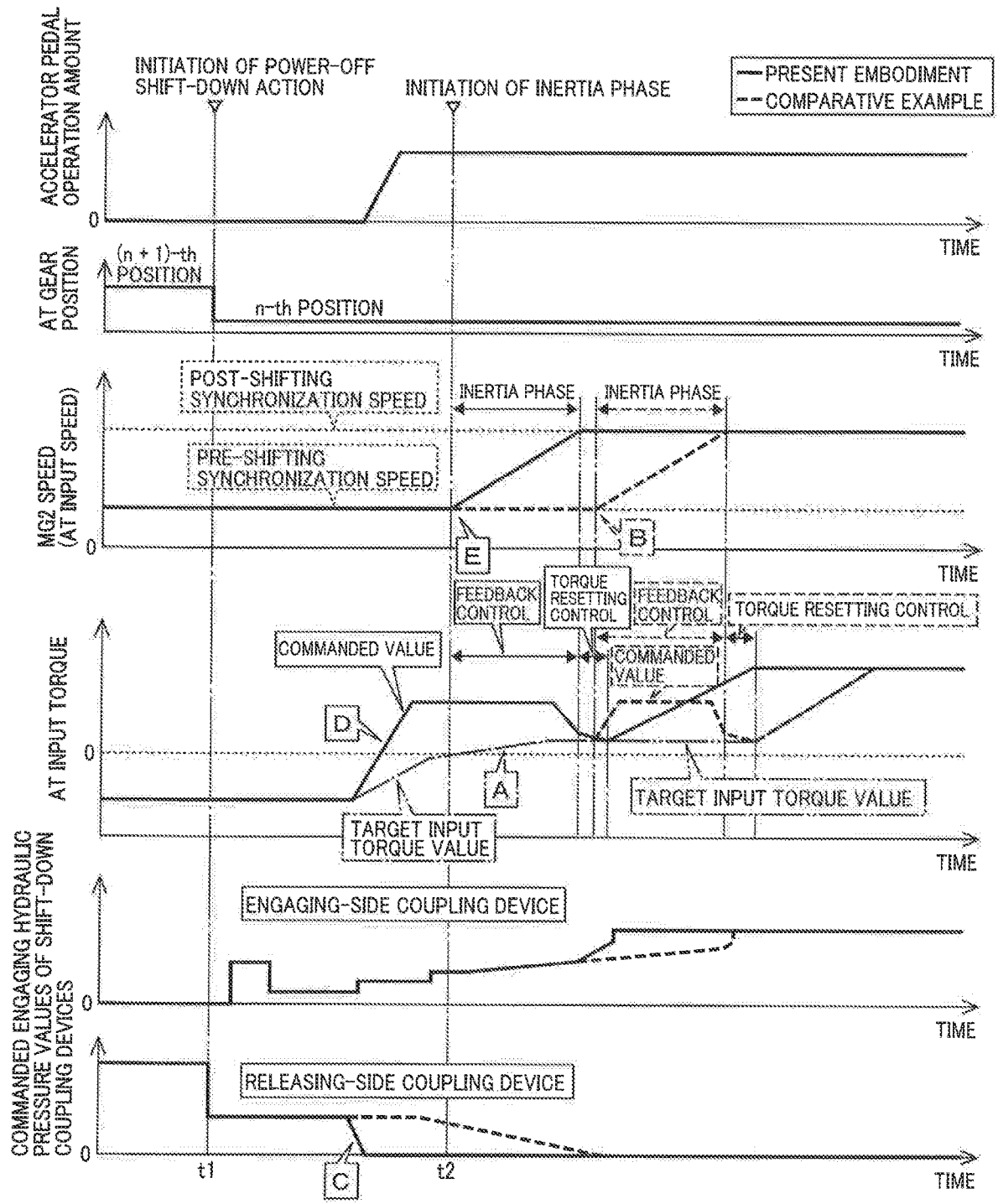
FIG. 9 is a time chart illustrating an example of changes of the various parameters when the control routine illustrated in the flow chart of FIG. 8 is executed.

FIG. 8 is the flow chart illustrating a major control operation of the electronic control device 80, namely, a control routine executed to improve the control response to the operator's vehicle acceleration requirement upon an increase of the accelerator pedal operation amount θacc in the process of the power-off shift-down action of the step-variable transmission portion 20, while reducing the risk of generation of the backlash-elimination shock of the step-variable transmission portion 20. This control routine is repeatedly executed during running of the vehicle 10. FIG. 9 is the time chart illustrating an example of changes of the various parameters when the control routine illustrated in the flow chart of FIG. 8 is executed.

The control routine of FIG. 8 is initiated with a step S10 corresponding to the function of the state determining portion 94, to determine that the step-variable transmission portion 20 is in the process of a power-off shift-down action. If a negative determination is obtained in the step S10, one cycle of execution of the control routine is terminated. If an affirmative determination is obtained in the step S10, the control flow goes to a step S20 also corresponding to the function of the state determining portion 94, to determine whether the accelerator pedal is operated prior to the initiation of the inertia phase in the process of down shifting of the set p-variable transmission portion 20. If an affirmative determination is obtained in the step S20, the control flow goes to a step S30 corresponding to the function of the step-variable shifting control portion 82, to reduce the command value of the engaging hydraulic pressure PRcb of the releasing-side coupling device CB at the earlier point of time as described above. The step S30 is followed by a step S40 also corresponding to the function of the state determining portion 94, to determine whether the command value of the engaging hydraulic pressure PRcb of the releasing-side coupling device CB has been reduced to the predetermined value. If an affirmative determination is obtained in the step S40, the control flow goes to a step S50 corresponding to the function of the actual input torque increasing portion 98, to implement the input torque increasing control for increasing the AT input torque Ti at a relatively high rate prior to the moment of initiation of the inertia phase of the power-off shift-down action. If a negative determination is obtained in the step S40, the control flow goes back to the step S30. If a negative determination is obtained in the step S20, on the other hand, the control flow goes to a step S60 corresponding to the functions of the step-variable shifting control portion 82 and the hybrid control portion 84, to implement a normal control of the power-off shift-down action of the step-variable transmission portion 20.

Referring to the time chart of FIG. 9 illustrating the changes of the various parameters when the control routine of FIG. 8 when the accelerator pedal is operated in the process of the power-off shift-down action of the step-variable transmission portion 20, the hydraulic control command signal Sat is generated in the power-off state at a point of time t1, so that the step-variable transmission portion 20 is shifted down from the (n+1)-th AT gear position to the n-th AT gear position. Where the accelerator pedal is operated in the process of the power-off shift-down action, the target input torque value Titgt is increased at a relatively low rate, as indicated by a mark "A" in FIG. 9, to reduce the risk of generation of the backlash-elimination shock. A one-dot chain line represents the target input torque value Titgt in the present embodiment and a comparative example, while a two-dot chain line represents the target input torque value Titgt in the comparative example. Since the rate of increase of the target input torque value Titgt is relatively low, the initiation of the inertia phase of the shift-down action is delayed as indicated by a mark "B" in the comparative example represented by a broken line, so that the control response to the operator's vehicle acceleration requirement is deteriorated. In the present embodiment of the invention represented by solid lines, on the other hand, the command value of the engaging hydraulic pressure PRcb of the releasing-side coupling device GB is reduced at an earlier point of time as indicated by a mark "C", upon an operation of the accelerator pedal in the process of the power-off shift-down action, and the input torque increasing control is implemented so that the AT input torque Ti is controlled to be larger than the target value Titgt prior to the moment of initiation of the inertia phase, as indicated by a mark "D", so that the inertia phase is initiated at an earlier point of time t2 than in the comparative example, as indicated by a mark "E", whereby the control response to the operator's vehicle acceleration requirement is improved. The reduction of the command value of the engaging hydraulic pressure PRcb of the releasing-side coupling device GB at the earlier point of time causes the transmission torque Tat of the step-variable transmission portion 20 to be considerably small or zero, and the absolute value of deceleration torque of the vehicle 10 upon the operation of the accelerator pedal is reduced, so that the vehicle operator is less likely to uncomfortably recognize a result of the earlier reduction of the command value of the engaging hydraulic pressure PRcb of the releasing-side coupling device GB.

As described above, the present embodiment is configured such that when the operation amount θacc of the accelerator pedal is increased prior to the initiation of the inertia phase in the process of the power-off shift-down action of the step-variable transmission portion 20, the amount of increase of the target value Titgt of the AT input torque Ti is restricted with respect to the amount of increase of the operator-required input torque value Tidem, so as to keep the target value Titgt of AT the input torque Ti not larger than the predetermined upper limit value Ti1 until the input torque resetting control is terminated, so that the risk of backlash-elimination shock of the step-variable transmission portion 20 upon completion of the shift-down action can be reduced. Further, upon an increase of the operation amount θacc of the accelerator pedal prior to the moment of initiation of the inertia phase of the power-off shift-down action, the input torque increasing control is implemented to control the input torque Ti of the step-variable transmission portion 20 so as to be larger than the target value Titgt, prior to the moment of initiation of the inertia phase of the shift-down action. Accordingly, the control apparatus in the form of the electronic control device 80 permits early initiation of the inertia phase of the shift-down action even where the target value Titgt of the input torque Ti of the step-variable transmission portion 20 is limited to or below the predetermined upper limit value Ti1. Thus, the electronic control device 80 permits an improvement of a control response to the operator's, requirement for acceleration of the vehicle 10 upon an increase of the operation amount θacc of the accelerator pedal in the process of the power-off shift-down action of the step-variable transmission portion 20, while reducing the risk of generation of the backlash-elimination shock with respect to the prior art control apparatus.

The present embodiment is further configured such that when the input torque increasing control is implemented by the actual input torque increasing portion 98, the engaging torque Tcb of the releasing-side coupling device CB is reduced at the earlier point of time than when the engaging torque Tcb of the engaging-side coupling device CB is increased, so that the AT input torque Ti is increased while the transmission torque Tat of the step-variable transmission portion 20 is relatively small or zero. Accordingly, the risk of generation of the backlash-elimination shock of the step-variable transmission portion 20 can be reduced, even when the vehicle 10 is switched from its non-driven state to its driven state in the process of the input torque increasing control.

The present embodiment is also configured such that the target value Titgt of the input torque Ti is gradually changed toward the operator-required input torque value Tidem after termination of the input torque resetting control implemented by the input torque resetting control portion 92, so that the operator's requirement for acceleration of the vehicle 10 can be met while at the same time the risk of generation of the backlash-elimination shock can be reduced.

The present embodiment is further configured such that the AT input torque Ti is reduced with the change of the MG2 speed Nm toward the post-shifting synchronization value Nmsyca, while the AT input torque Ti during the inertia phase of the shift-down action is larger than the target value Titgt, so that the risk of generation of the backlash-elimination shock of the step-variable transmission portion 20 upon completion of the shift-down action can be further reduced.

The embodiment is also configured such that the input torque increasing control is implemented by the actual input torque increasing portion 98 when the operation amount θacc of the accelerator pedal is increased by the amount not smaller than the predetermined value θacc1, so that it is possible to adequately improve the control response to the operator's requirement for acceleration of the vehicle 10, while reducing the risk of generation of the backlash-elimination shock, where the operator has a comparatively high degree of requirement for the vehicle acceleration. Where the operator has a comparatively low degree of requirement for the vehicle acceleration, the risk of generation of the backlash-elimination shock can be further reduced.

The present embodiment is further configured such that the input torque increasing control is implemented only when the temperature THoil of the working fluid used to operate the hydraulically operated frictional coupling devices CB is not lower than the predetermined value THoil1. Namely, the input torque increasing control is not implemented at the relatively low temperature THoil of the working fluid at which the hydraulic control response of the coupling devices CB is low. Accordingly, it is possible to reduce deterioration of controllability of the shift-down action of the step-variable transmission portion 20 due to a loss of balance between the engaging torque Tcbs of the relevant two frictional coupling devices CB controlled to implement the shift-down action and the AT input torque Ti.

While the preferred embodiment of this invention has been described in detail by reference to the drawings, it is to be understood that the present invention may be otherwise embodied.

For example, the amount of increase of the AT input torque Ti by the input torque increasing control may be decreased with a decrease of the working fluid temperature THoil, that is, the AT input torque Ti may be made closer to the target value Titgt as the working fluid temperature THoil is lowered.

In the illustrated embodiment, the mathematical equation (1) is the model equation for the shifting control of the step-variable transmission portion 20, in which the MG2 speed change rate dNm/dt is used as the value indicative of the state of rotation of the input rotary member of the step-variable transmission portion 20, while the engine speed change rate dNe/dt is used as the value indicative of the state of operation of the engine 14. However, the state of rotation of the input rotary member of the step-variable transmission portion 20 and the state of operation of the engine 14 may be respectively represented by the rotating speed of the input rotary member and the operating speed Ne of the engine 14. In this case, the shifting control of the step-variable transmission portion 20 to control the AT input torque Ti according to the model mathematical equation (1) on the basis of the MG2 speed Nm and the engine speed Ne may be implemented by a known PI control in which feedback control amounts of the MG2 speed Nm and the engine speed No are calculated on the basis of a difference between target and actual values of the MG2 speed Nm and the engine speed Me.

In the illustrated embodiment, the vehicle 10 is provided with the transmission device 40. However, the control apparatus according to the present invention is equally applicable to a hybrid vehicle of a parallel type which is provided with an engine, a motor/generator operatively connected to the drive wheels in a power transmittable manner, and a step-variable transmission constituting a part of a power transmitting path between the engine and drive wheels. Further, the control apparatus according to the present invention is applicable to a hybrid vehicle of a series type which is provided with: an engine; an electricity generating motor/generator operated with a drive force of the engine; a vehicle driving motor/generator operated an electric power generated by the electricity generating motor/generator and/or an electric power supplied from a battery; and a step-variable transmission constituting a part of a power transmitting path between the vehicle driving motor/generator and drive wheels. Further, the present control apparatus is applicable to a vehicle provided with an engine functioning as a vehicle drive power source, and a step-variable transmission constituting a part of a power transmitting path between the engine and drive wheels. Further, the present control apparatus is applicable to a vehicle provided with a motor/generator functioning as a vehicle drive power source, and a step-variable transmission constituting a part of a power transmitting path between the motor/generator and drive wheels. In essence, the present control apparatus is applicable to a vehicle provided with a vehicle drive power source, and a step-variable transmission constituting a part of a power transmitting path between the vehicle drive power source and drive wheels.

In the illustrated embodiment, the vehicle 10 is provided with the electrically controlled transmission mechanism in the form of the continuously-variable transmission portion 18 having the differential mechanism 32 which is the planetary gear set of the single-pinion type. However, the continuously-variable transmission portion 18 may be replaced by a transmission mechanism a differential function of which is limited by controlling a clutch or brake connected to a rotary member of the differential mechanism 32. Further, the differential mechanism 32 may be a differential mechanism which consists of a plurality of planetary gear sets connected to each other and which has four or more rotary elements. Alternatively, the differential mechanism 32 may be replaced by a differential gear device which has a pinion rotated by the engine 14 and a pair of bevel gears meshing with the pinion, and wherein the first motor/generator MG1 and the intermediate power transmitting member 30 are respectively connected to the pinion and the bevel gears. Further alternatively, the differential mechanism 32 may be replaced by a mechanism consisting of two or more planetary gear sets having rotary elements which are connected to each other and which are respectively operatively connected to the engine, motor/generator and vehicle drive wheels in a power transmittable manner.

In the illustrated embodiment, the step-variable transmission portion 20 of the planetary gear type is provided as the step-variable transmission constituting a part of the power transmitting path between the drive power source and the drive wheels. However, the step-variable transmission portion 20 may be replaced by any other type of step-variable transmission such as a known DCT (dual clutch transmission) which is a synchronous-meshing parallel two-axes type automatic transmission having two input shafts which are connected to respective coupling devices (clutches) for establishing respective even-number and odd-number gear positions. In the DCT, one of a plurality of coupling devices or a coupling device to be controlled for a shifting action of the DCT corresponds to the coupling device connected to each of the two input shafts.

In the illustrated embodiment, the ten overall speed positions are selectively established for the four AT gear positions. However, the numbers of the overall speed positions and the AT gear positions are not limited to those of the illustrated embodiment. The number of the overall speed positions is preferably equal to or larger than that of the AT gear positions, more preferably larger than that of the AT gear positions. For example, the number of the overall speed positions is desirably twice the number of the AT gear positions, or more. The step-variable transmission portion 20 is shifted from one of the AT gear positions to another, so that the rotating speed of the intermediate power transmitting member 30 and the operating speed of the second motor/generator MG2 connected to the intermediate power transmitting member 30 are held within predetermined ranges. On the other hand, the transmission device 40 is shifted from one of the overall speed positions to another, so that the engine speed Ne is held within a predetermined range. In view of the above, the numbers of the AT gear positions and the overall speed positions are suitably determined.

While the preferred embodiment and its modifications have been described above for illustrative purpose only, it is to be understood that the present invention may be embodied with various other changes and modifications not described herein, which may occur to those skilled in the art.

NOMENCLATURE OF ELEMENTS

10: vehicle (hybrid vehicle)
14: engine (drive power source)
18: electrically controlled continuously-variable transmission portion (electrically controlled transmission mechanism)
20: mechanically operated step-variable transmission portion (step-variable transmission; mechanically operated transmission mechanism)
28: drive wheels
30: intermediate power transmitting member (input rotary member of step-variable transmission; output rotary member of electrically controlled transmission mechanism)
32: differential mechanism
80: electronic control device (control apparatus)
82: step-variable shifting control portion. (shift control portion)
88: feedback control portion
90: target input torque setting portion
92: input torque resetting control portion
94: state determining portion
96: actual input torque reducing portion
98: actual input torque increasing portion
CB: coupling devices (frictional coupling devices)
MG1: first motor/generator
MG2: second motor/generator (drive power source; motor/generator)

What is claimed is:

1. A control apparatus for a vehicle provided with a drive power source, drive wheels, and a step-variable transmission which constitutes a part of a power transmitting path between the drive power source and the drive wheels and which has a plurality of coupling devices which are selectively engaged to establish a selected one of a plurality of gear positions, the control apparatus comprising:

a feedback control portion configured to implement a feedback control of an input torque of the step-variable transmission during an inertia phase of a shift-down action of the step-variable transmission, by feedback compensation of a target value of the input torque according to an operation amount of an accelerator pedal by an operator of the vehicle, such that a value representative of a state of rotation of an input rotary member of the step-variable transmission coincides with a target value at which a rotating speed of the input rotary member changes toward a post-shifting synchronization value to be established after completion of the shift-down action;

a state determining portion configured to determine whether the rotating speed of the input rotary member is equal to the post-shifting synchronization value;

an input torque resetting control portion configured to implement an input torque resetting control to change the input torque of the step-variable transmission toward the target value, when the state determining portion determines that the rotating speed of the input rotary member is equal to the post-shifting synchronization value;

a target input torque setting portion configured to be operated when the operation amount of the accelerator pedal is increased in the process of the shift-down action implemented in a power-off state of the vehicle, the target input torque setting portion restricting an amount of increase of the target value of the input torque with respect to an amount of increase of an operator-required input torque value represented by the operation amount of the accelerator pedal, so as to keep the target value of the input torque not larger than a predetermined upper limit value until the input torque resetting control is terminated; and an actual input torque increasing portion configured to be operated when the operation amount of the accelerator pedal is increased prior to a moment of initiation of the inertia phase of the shift-down action in the power-off state, the actual input torque increasing portion implementing an input torque increasing control to control the input torque of the step-variable transmission so as to be larger than the target value, prior to the moment of initiation of the inertia phase of the shift-down action.

2. The control apparatus according to claim 1, further comprising a shifting control portion configured to be operated when the input torque increasing control is implemented by the actual input torque increasing portion, the shifting control portion controlling a torque capacity of a releasing-side coupling device of the plurality of coupling devices which is to be brought into a released state to implement the shift-down action, and a torque capacity of an engaging-side coupling device of the coupling devices which is to be brought into an engaged state to implement the shift-down action, the shifting control portion reducing the torque capacity of the releasing-side coupling device at an earlier point of time than when the shifting control portion increases the torque capacity of the engaging-side coupling device.

3. The control apparatus according to claim 1, wherein the target input torque setting portion gradually changes the target value of the input torque toward the operator-required input torque value after termination of the input torque resetting control implemented by the input torque resetting control portion.

4. The control apparatus according to claim 1, further comprising an actual input torque reducing portion configured to reduce the input torque of the step-variable transmission with a change of the rotating speed of the input rotary member of the step-variable transmission toward the post-shifting synchronization value, while the input torque during the inertia phase of the shift-down action is larger than the target value.

5. The control apparatus according to claim 1, wherein the actual input torque increasing portion implements the input torque increasing control when the operation amount of the accelerator pedal is increased by an amount not smaller than a predetermined value.

6. The control apparatus according to claim 1, wherein the plurality of coupling devices are hydraulically operated frictional coupling devices, and the actual input torque increasing portion implements the input torque increasing control when a temperature of a working fluid used to operate the hydraulically operated frictional coupling devices is not lower than a predetermined value.

7. The control apparatus according to claim 1, wherein the vehicle is a hybrid vehicle provided with: an engine functioning as the drive power source; an electrically controlled transmission mechanism having a differential mechanism to which the engine is operatively connected in a power transmittable manner and a first motor/generator to which the differential mechanism is operatively connected in a power transmittable manner such that a differential state of the differential mechanism is controlled by controlling an operating state of the first motor/generator; and a second motor/generator operatively connected to an output rotary member of the electrically controlled transmission mechanism and also functioning as the drive power source, and wherein the step-variable transmission is a mechanically operated transmission mechanism constituting a part of a power transmitting path between the output rotary member of the electrically controlled transmission mechanism and the drive wheels, the feedback control portion being configured to feedback-control an output torque of the first motor/generator and an output torque of the second motor/generator during the inertia phase of a shifting action of the mechanically operated transmission mechanism, on the basis of an output torque of the engine and a torque transmitted through the mechanically operated transmission mechanism, such that a value representative of a state of rotation of an input rotary member of the mechanically operated transmission mechanism and a value representative of a state of operation of the engine coincide with respective target values, the input torque resetting control portion implementing the input torque resetting control when the rotating speed of the input rotary member of the mechanically operated transmission mechanism has become equal to the post-shifting synchronization value.

* * * * *